United States Patent [19]
Katayose et al.

[11] Patent Number: 6,027,183
[45] Date of Patent: Feb. 22, 2000

[54] VEHICLE DYNAMICS CONTROL SYSTEM

[75] Inventors: Shinji Katayose, Tokyo; Masamichi Imamura, Kanagawa, both of Japan

[73] Assignee: Unisia Jecs Corporation, Atsugi, Japan

[21] Appl. No.: 08/986,419

[22] Filed: Dec. 8, 1997

[30] Foreign Application Priority Data

Dec. 10, 1996 [JP] Japan ................................ 8-351931

[51] Int. Cl.[7] .................................................. B60T 8/64
[52] U.S. Cl. ................................... 303/146; 303/113.5
[58] Field of Search ................................ 303/146, 147, 303/187, 113.5

[56] References Cited

U.S. PATENT DOCUMENTS

| | | | |
|---|---|---|---|
| 4,898,431 | 2/1990 | Karnopp et al. | 303/146 |
| 5,702,165 | 12/1997 | Koibuchi | 303/146 |
| 5,752,752 | 5/1998 | Tozu et al. | 303/146 |
| 5,762,406 | 6/1998 | Yasui et al. | 303/146 |
| 5,826,951 | 10/1998 | Sano | 303/146 |

FOREIGN PATENT DOCUMENTS

| | | |
|---|---|---|
| 39 19 347 | 2/1990 | Germany . |
| 197 22 716 | 3/1998 | Germany . |
| 8-133039 | 5/1996 | Japan . |
| WO96/36514 | 11/1996 | Japan . |

*Primary Examiner*—Matthew C. Graham
*Attorney, Agent, or Firm*—Foley & Lardner

[57] ABSTRACT

A vehicle dynamics control system for an automotive vehicle with a diagonal split layout of brake circuits comprises a tandem master cylinder, two hydraulic pumps each fluidly disposed in one of the two brake circuits, selector valves for selecting a brake-fluid pressure to be fed to a first brake line and for selecting a brake-fluid pressure to be fed to a second brake line, a plurality of pressure control valves for regulating a fluid pressure in each individual wheel-brake cylinder, vehicle sensors for detecting a vehicle's cornering behavior, and a control unit being responsive to the sensor's input information for controlling the respective valves. The control unit operates to supply the fluid pressure generated from the pump to an inner front wheel-brake cylinder in the vehicle understeer on turns. The control unit also operates to supply the fluid pressure generated from the pump to an outer front wheel-brake cylinder in the vehicle oversteer on turns.

10 Claims, 14 Drawing Sheets

VEHICLE DYNAMICS CONTROL SYSTEM

BACKGROUND OF THE INVENTION

1. Field of the Invention

The present invention relates to a vehicle dynamics control system, and specifically to a system which is capable of automatically controlling or compensating for the vehicle's cornering behavior or vehicle's turning behavior or steer characteristics such as understeer or oversteer on turns by automatically properly controlling or regulating the hydraulic brake pressure applied to the individual wheel-brake cylinders.

2. Description of the Prior Art

Front-engine, front-wheel-drive (FF) vehicles, generally use a so-called diagonal split layout of brake circuits (sometimes termed "X-split layout", in which one part of the tandem master cylinder output is connected via a first brake pipeline (a first brake circuit) to front-left and rear-right wheel-brake cylinders and the other part is connected via a second brake pipeline (a second brake circuit) to front-right and rear-left wheel-brake cylinders. In vehicles with such an X-split layout of brake circuits, when the brake pedal is depressed by the driver and thus primary and secondary master-cylinder pistons are pushed, the brake-fluid pressure generated from one part of the master cylinder output and the brake-fluid pressure generated from the other part are supplied to the respective first and second brake circuits, with the result that the negative wheel torque (resulting in a braking force) is applied to the individual wheels. As is generally known, when a vehicle is rounding a curve, owing to road surface conditions (so-called low-$\mu$ or high-$\mu$ roads), changes in the vehicle velocity, throttle-on or throttle-off conditions, or the like, the vehicle may often exhibit undesired steer characteristics, namely oversteer tendencies in which the actual radius of turn is less than the intended radius of turn or understeer tendencies in which the actual radius of turn is greater than the intended radius of turn. Oversteer is generally known as an under-response to steering input as by generation of excessive slip angle on rear road wheels, whereas understeer is generally known as an over-response to steering input as by generation of excessive slip angle on front road wheels. The driver must have a great deal of skill to avoid undesired understeer or oversteer by adjusting increase or decrease in steer angle only by way of the driver's braking or steering action. For the reasons set forth above, in recent years, there have been developed and proposed various active steer-characteristics control systems in which the vehicle's cornering behavior is automatically controlled or regulated by adjusting the brake-fluid pressure applied to each individual wheel-brake cylinder by means of an electronic control unit (ECU) or an electronic control module (ECM). One such vehicle's cornering behavior controller (simply a vehicle controller) has been disclosed in Japanese Patent Provisional Publication No. 8-133039. In the vehicle controller disclosed in the Japanese Patent Provisional Publication No. 8-133039, when the vehicle experiences understeer during turns, the vehicle controller operates to build up the brake-fluid pressure in the wheel-brake cylinder of the rear road wheel rotating on the inside, thereby avoiding understeer. On the contrary, when the vehicle experiences oversteer on turns, the vehicle controller operates to build up the brake-fluid pressure in the wheel-brake cylinder of the front road wheel rotating on the outside, thereby avoiding oversteer. The Japanese Patent Provisional Publication No. 8-133039 teaches the increase in brake-fluid pressure in the front wheel-brake cylinder on the outside to avoid oversteer and the increase in brake-fluid pressure in the rear wheel-brake cylinder on the inside to avoid understeer during turns. However, on turns, the car weight is usually transferred to the outside front wheel. Particularly in front-engine, front-wheel-drive (FF) vehicles, such a tendency is remarkable since the center of gravity of the car is offset toward the front end. Therefore, the magnitude of wheel load acting on the inner rear wheel tends to become the minimum value during turns, as compared with the other road wheels. For the reasons discussed above, even if, on turns, the brake-fluid pressure in the rear wheel-brake cylinder on the inside is built up by means of the conventional vehicle controller, it may be impossible to carry out adequate braking effect, and thus it may be difficult to effectively avoid understeer tendencies owing to load transfer to the outer front wheel during turns.

SUMMARY OF THE INVENTION

Accordingly, it is an object of the invention to provide a vehicle dynamics control system which avoids the aforementioned disadvantages of the prior art.

It is another object of the invention to provide a vehicle dynamics control system for an automotive vehicle with a so-called diagonal split layout of brake circuits, which effectively compensates for the undesired vehicle's cornering behavior (understeer or oversteer) toward neutral steer.

In order to accomplish the aforementioned and other objects of the present invention, a vehicle dynamics control system for an automotive vehicle with a diagonal split layout of brake circuits, the system comprises a first brake line connected to a first diagonally-opposed pair of wheel-brake cylinders, a second brake line connected to a second diagonally-opposed pair of wheel-brake cylinders, a first brake-fluid pressure generator for generating a first brake-fluid pressure which is variable depending on a magnitude of brake-pedal depression, a second brake-fluid pressure generator for generating a second brake-fluid pressure, independently of the first brake-fluid pressure based on the magnitude of brake-pedal depression, a first brake-fluid pressure selector valve means for selecting a brake-fluid pressure to be fed to the first brake line from between the first and second brake-fluid pressures, a second brake-fluid pressure selector valve means for selecting a brake-fluid pressure to be fed to the second brake line from between the first and second brake-fluid pressures, a first pressure control valve means fluidly disposed in a first brake circuit including the first brake line for regulating a fluid pressure in each of the first diagonally-opposed pair of wheel-brake cylinders, a second pressure control valve means fluidly disposed in a second brake circuit including the second brake line for regulating a fluid pressure in each of the second diagonally-opposed pair of wheel-brake cylinders, a vehicle-behavior detector for detecting a vehicle's cornering behavior, and a brake-fluid pressure control means being responsive to input information from the vehicle-behavior detector for controlling the first and second brake-fluid pressure selector valve means and the first and second pressure control valve means, wherein the brake-fluid pressure control means operates to supply the second brake-fluid pressure to an inner front wheel-brake cylinder of the first and second diagonally-opposed pairs of wheel-brake cylinders when the input information from the vehicle-behavior detector indicates a vehicle understeer during a turn, and operates to supply the second brake-fluid pressure to an outer front wheel-brake cylinder of the first and second diagonally-opposed pairs of wheel-brake cylinders when the input information from the vehicle-behavior detector indicates a vehicle oversteer during a turn. Preferably, the brake-fluid pressure control means may operate to reduce a fluid pressure in an outer rear wheel-brake cylinder of the first and second diagonally-opposed pairs of wheel-brake cylinders when the input information from the vehicle-behavior detector indicates the vehicle understeer during a turn, and may operate to reduce a fluid pressure in an inner rear wheel-brake cylinder of the first and second diagonally-opposed pairs of wheel-brake cylinders when the input information from the vehicle-behavior detector indicates the vehicle oversteer during a turn. More preferably, the brake-fluid pressure control means may permit the first brake-fluid pressure to be fed to a brake line connected to both the outer front wheel-brake cylinder and the inner rear wheel-brake cylinder from between the first and second brake lines when the input information from the vehicle-behavior detector indicates the vehicle understeer during a turn, and may permit the first brake-fluid pressure to be fed to a brake line connected to both the inner front wheel-brake cylinder and the outer rear wheel-brake cylinder from between the first and second brake lines when the input information from the vehicle-behavior detector indicates the vehicle oversteer during a turn. It is preferable that the vehicle-behavior detector may comprise at least wheel speed sensors for monitoring front-left, front-right, rear-left and rear-right wheel speeds, a yaw-velocity sensor for monitoring a yaw velocity about a z-axis of the vehicle, a lateral acceleration sensor for monitoring a lateral acceleration exerted on the vehicle, and a steering angle sensor for monitoring a steer angle.

DESCRIPTION OF THE PREFERRED EMBODIMENTS

Figure 2:
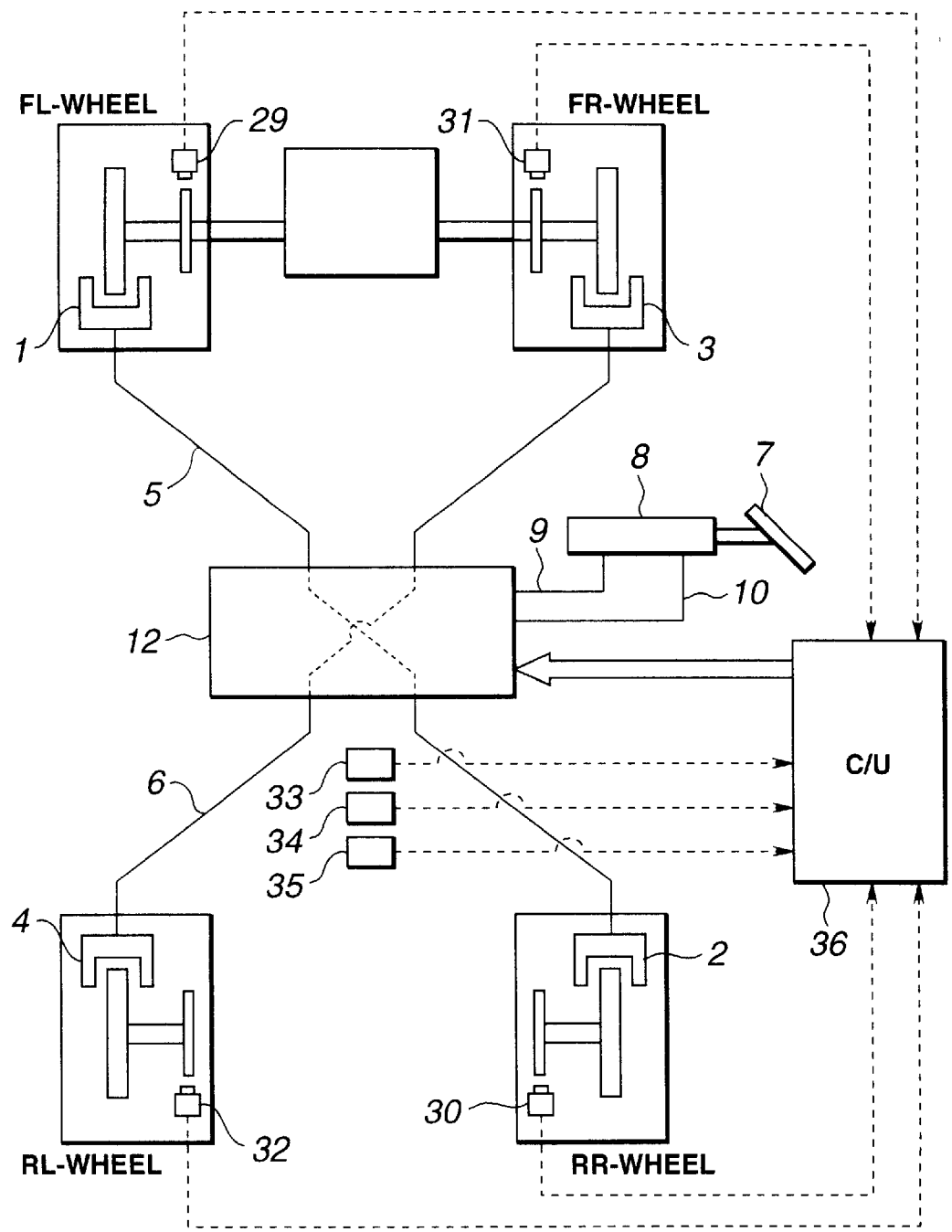
FIG. 2 is a system block diagram illustrating a first embodiment of the vehicle dynamics control system of the invention.
Figure 3:
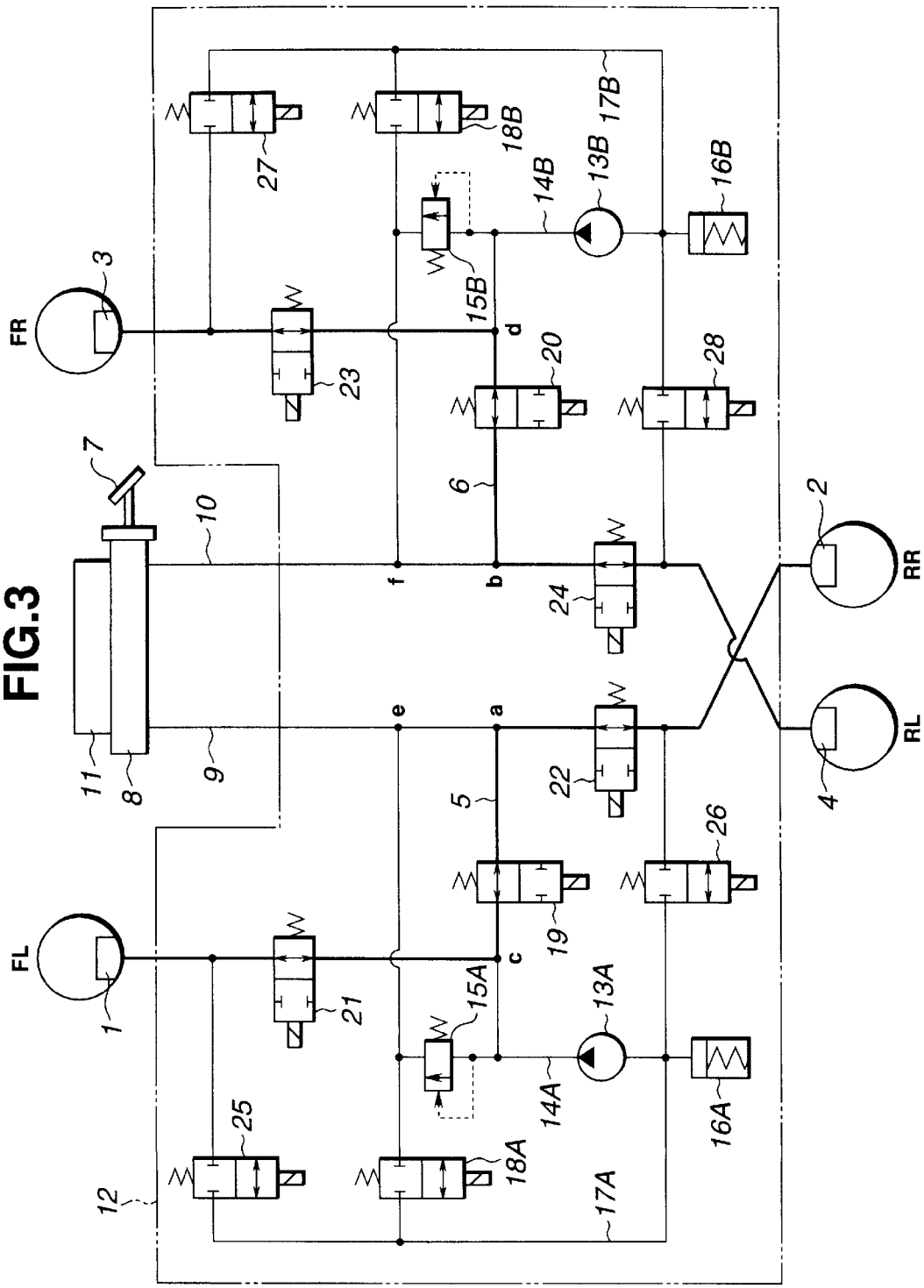
FIG. 3 is a hydraulic circuit diagram illustrating a hydraulic circuit being applicable to the vehicle dynamics control system of the first embodiment.

Referring now to the drawings, particularly to FIGS. 2–15, there is shown the vehicle dynamics control system of the first embodiment. The hydraulic circuits employed in the vehicle dynamics control system of the first embodiment is hereinbelow described in detail by reference to FIGS. 2 and 3. Component parts denoted by reference signs 1 and 2 respectively correspond to front-left and rear-right wheel-brake cylinders, whereas component parts denoted by reference signs 3 and 4 respectively correspond to front-right and rear-left wheel-brake cylinders. A line denoted by reference sign 5 is a first brake pipeline connected to both the front-left and rear-right wheel-brake cylinders 1 and 2, whereas a line denoted by reference sign 6 is a second brake pipeline connected to both the front-right and rear-left wheel-brake cylinders 3 and 4. That is to say, the vehicle of FIG. 2 uses a so-called diagonal split layout of brake circuits (called an "X-split layout"). The brake pipelines 5 and 6 are provided for directing the brake-fluid pressure from a dual-brake system master cylinder 8 (a tandem master cylinder) or a fluid-pressure control pumps 13A or 13B to each of the wheel-brake cylinders 1 to 4. The tandem master cylinder 8 has two pistons which are linked to a brake pedal 7, so that, in operation, depression of the brake pedal 7 forces the primary and secondary master-cylinder pistons to axially slide in the master cylinder. The sliding movement of the pistons applies pressure to fluid ahead of each of the pistons, forcing the fluid through the first and second brake lines 5 and 6 to the wheel-brake cylinders 1, 2, 3 and 4. That is, the tandem master cylinder 8 serves as a brake-fluid pressure source (or a brake fluid pressure generator means). As seen in FIGS. 2 and 3, the primary brake outlet port of the master cylinder 8 is connected through a primary fluid-supply conduit 9 to the brake line 5 at a connecting point a, whereas the secondary brake outlet port of the master cylinder is connected through a secondary fluid-supply conduit 10 to the brake line 6 at a connecting point b. Reference sign 11 denotes a brake-fluid reservoir from which brake fluid is fed to the master cylinder 8. Reference sign 12 denotes a brake-fluid pressure control unit (or a hydraulic modulator) for controlling or regulating or modulating the brake-fluid pressure to each of the wheel-brake cylinders 1 through 4. In FIG. 3, the fluid-pressure control pump 13A is fluidly disposed in a fluid line 14A, whereas the fluid-pressure control pump 13B is fluidly disposed in a fluid line 14B. The fluid-pressure control pumps 13A and 13B serve as a controlled brake fluid pressure generator means. The outlet port of the pump 13A is connected through the line 14A to the first brake line 5 at a connecting point c, while the inlet port of the pump 13A is connected to a primary reservoir 16A. On the other hand, the outlet port of the pump 13B is connected through the line 14B to the second brake line 6 at a connecting point d, while the inlet port of the pump 13B is connected to a secondary reservoir 16B. The two pumps 13A and 13B are usually in stopped states (OFF conditions). The pumps 13A and 13B are driven by respective control signals generated from an electronic control unit 36 discussed later. Actually, the pumps 13A and 13B are driven in accordance with the vehicle dynamics control routine, which will be fully described later, to avoid undesired vehicle's cornering behavior (excessive understeer or oversteer), and to feed the brake fluid pumped to the brake lines 5 and 6, independently of the master-cylinder pressure produced by depression of the brake pedal 7. To regulate the discharge pressure of each of the pumps 13A and 13B, a primary relief valve 15A is fluidly disposed in the line 14A, whereas a secondary relief valve 15B is fluidly disposed in the line 14B. The reservoir 16A connected to one end of the line 14A is provided to temporarily store a small amount of brake fluid returned from the wheel-brake cylinders 1 and 2 under a particular condition in which a by-pass line 17A communicates with the first brake line 5 (the inlet/outlet ports of the wheel-brake cylinders 1 and 2) with the fluid-pressure control valves 25 and 26 fully opened. On the other hand, the reservoir 16B connected to one end of the line 14B is provided to temporarily store a slight brake fluid returned from the wheel-brake cylinders 3 and 4 under a particular condition in which a by-pass line 17B communicates with the second brake line 6 (the inlet/outlet ports of the wheel-brake cylinders 3 and 4) with the fluid-pressure control valves 27 and 28 fully opened. As seen in FIG. 3, one end of the by-pass line 17A is connected to the primary fluid-supply line 9 at a connecting point e, while the other end is connected to the primary reservoir 16A. Similarly, one end of the by-pass line 17B is connected to the secondary fluid-supply line 10 at a connecting point f, while the other end is connected to the secondary reservoir 16B. A primary directional control valve 18A is fluidly disposed in the by-pass line 17A extending between the connecting point e and the primary reservoir 16A, whereas a secondary directional control valve 18b is fluidly disposed in the by-pass line 17B extending between the connecting point f and the secondary reservoir 16B. In the shown embodiment, each of the two directional control valves 18A and 18B is comprised of a typical two-port, two-position, normally-closed type electro-magnetic directional control valve. The open and closed positions of each of the directional control valves 18A and 18B are controllable or switchable in response to a control signal generated from the control unit 36. During the vehicle dynamics control mode, the brake pedal 7 is not always depressed. So, the brake fluid must be forcibly supplied from the master-cylinder reservoir 11 towards the inlet ports of the pumps 13A and 13B, to execute the automatic proper vehicle dynamics control. Therefore, as soon as the vehicle dynamics control is brought into operation, the directional control valves 18A and 18B are switched to open in response to command signals from the control unit 36, thereby permitting the brake-fluid supply from the reservoir 11 via the directional control valve 18A to the inlet of the pump 13A and permitting the rake-fluid supply from the reservoir 11 via the directional control valve 18B to the inlet of the pump 13B. A primary fluid-pressure selector valve 19 is fluidly disposed in the first brake line 5, while a secondary fluid-pressure selector valve 20 is fluidly disposed in the second brake line 6. Each of the two fluid-pressure selector valves 19 and 20 is comprised of a typical two-port, two-position, normally-open type electro-magnetic directional control valve. In the hydraulic circuit of shown in FIG. 3, the primary fluid-pressure selector valve 19 cooperates with a fluid-pressure control valve 22 to function as a first brake-fluid pressure selector means which directs either one of the brake-fluid pressure output from the primary master-cylinder outlet port or the brake-fluid pressure output from the control pump 13A to the first brake line 5. On the other hand, the secondary fluid-pressure selector valve 20 cooperates with a fluid-pressure control valve 24 to function as a second brake-fluid pressure selector means which directs either one of the brake-fluid pressure output from the secondary master-cylinder outlet port or the brake-fluid pressure output from the control pump 13B to the second brake line 6. A first pair of fluid-pressure control valves 21 and 22 are fluidly disposed in the first brake line 5 so that the pressure control valve 21, the primary fluid-pressure selector valve 19, and the pressure control valve 22 are arranged in series to each other in that order. A second pair of fluid-pressure control valves 23 and 24 are fluidly disposed in the second brake line 6 so that the pressure control valve 23, the secondary fluid-pressure selector valve 20, and the pressure control valve 24 are arranged in series to each other in that order. In the shown embodiment, each of the four fluid-pressure control valves 21, 22, 23 and 24 is comprised of a typical two-port, two-position, normally-open type electro-magnetic solenoid valve. One port of the pressure control valve 21 is connected to the inlet/outlet port of the front-left wheel-brake cylinder 1, and the other port is connected via the connecting point c to one port of the primary selector valve 19. One port of the pressure control valve 22 is connected to the inlet/outlet port of the rear-right wheel-brake cylinder 2, and the other port is connected via the connecting point a to the other port of the primary selector valve 19. One port of the pressure control valve 23 is connected to the inlet/outlet port of the front-right wheel-brake cylinder 3, and the other port is connected via the connecting point d to one port of the secondary selector valve 20. One port of the pressure control valve 24 is connected to the inlet/outlet port of the rear-left wheel-brake cylinder 4, and the other port is connected via the connecting point b to the other port of the secondary selector valve 20. Four fluid-pressure control valves 25, 26, 27 and 28 are fluidly disposed in the respective return lines to return brake fluid from the respective individual wheel-brake cylinders to the inlet ports of the pumps 13A and 13B. Each of the fluid-pressure control valves 25 to 28 is comprised of a typical two-port, two-position, normally-closed type electromagnetic solenoid valve. The pressure control valve 25 is fluidly disposed in a return line being connected between the inlet/outlet port of the front-left wheel-brake cylinder 1 and the primary reservoir 16A, so that the inflow port of the valve 25 is connected to the first brake line 5 near the port of the wheel cylinder 1 and the outflow port of the valve 25 is connected via a portion of the primary by-pass line 17A to the reservoir 16A. The pressure control valve 26 is fluidly disposed in a return line being connected between the inlet/outlet port of the rear-right wheel-brake cylinder 2 and the primary reservoir 16A, so that the inflow port of the valve 26 is connected to the first brake line 5 near the port of the wheel cylinder 2 and the outflow port of the valve 26 is connected directly to the primary reservoir 16A. The pressure control valve 27 is fluidly disposed in a return line being connected between the inlet/outlet port of the front-right wheel-brake cylinder 3 and the secondary reservoir 16B, so that the inflow port of the valve 27 is connected to the second brake line 6 near the port of the wheel cylinder 3 and the outflow port of the valve 27 is connected via a portion of the secondary by-pass line 17B to the reservoir 16B. The pressure control valve 28 is fluidly disposed in a return line being connected between the inlet/outlet port of the rear-left wheel-brake cylinder 4 and the secondary reservoir 16B, so that the inflow port of the valve 28 is connected to the second brake line 6 near the port of the wheel cylinder 4 and the outflow port of the valve 28 is connected directly to the reservoir 16B. The on/off reaction of each of the pressure control solenoid valves 25, 26, 27 and 28 is controlled in response to a control signal (in the form of a pulse signal) generated from the control unit 36. Particularly, the on/off reaction of each of the pressure control solenoid valves 21 and 25 associated with the front-left wheel-brake cylinder 1 and the pressure control solenoid valves 223 and 27 associated with the front-right wheel-brake cylinder 3 is controlled in response to a control signal generated from the control unit 36 in the form of a pulse signal (namely a pressure build-up pulse signal, a pressure-reduction pulse signal, and a pressure-hold pulse signal). The fluid-pressure control operation of the hydraulic modulator 12 with regard to one diagonally opposed wheel-brake cylinders 1 and 2 connected to the first brake line 5 will be hereinafter described in detail, while detailed description of the control operation of the hydraulic modulator 12 with regard to the other diagonally opposed wheel-brake cylinders 3 and 4 connected to the second brake line 6 will be omitted, since the above description thereon seems to be self-explanatory. The hydraulic modulator 12 operates as follows.

When the brake-fluid pressure (essentially equal to the master-cylinder pressure) produced by the master cylinder 8 must be directed to the first brake line 5, as shown in FIG. 3, the hydraulic modulator 12 operates to maintain the fluid-pressure selector valve 19 at its full fluid-communication position (a full open position) and simultaneously to maintain the pressure control valves 21 and 22 at their full fluid-communication positions (full open positions) and to maintain the pressure control valves 25 and 26 disposed in the return line at their shut-off positions (fully-closed positions). Under these conditions, depression of the brake pedal 7 results in a rise of fluid pressure in the master cylinder. The fluid pressure is directed from the master-cylinder outlet port through the fluid-supply conduit 9 and the first brake line 5 to the diagonally opposed wheel-brake cylinders land 2. As a consequence, the braking force acting on each of front-left and rear-right road wheels is freely controllable or adjustable by adjusting the magnitude of depression of the brake pedal 7 by the driver's foot. On the contrary, when the brake-fluid pressure produced by the pump 13A has to be delivered to the first brake line 5, the hydraulic modulator 12 operates to switch the selector valve 19 to its shut-off position, and simultaneously to maintain the pressure control valve 21 at the full fluid-communication position, and to shift the pressure control valve 22 to the shut-off position and to remain the pressure control valve 25 shut off. Under these conditions, when the control pump 13A is driven in response to the control signal from the control unit 36, the fluid pressure produced by the pump 13A is applied to the wheel cylinder 1 via the first brake line 5, with the result that the braking force acting on the front-left road wheel increases under the increased front-left wheel cylinder pressure. In the vehicle dynamics control system of the first embodiment, since it is unnecessary to build up the fluid pressure in the rear-right wheel-brake cylinder 2, the hydraulic circuit system associated with the wheel cylinder 2 is designed so that the fluid pressure produced by the pump 13A cannot be supplied to the wheel-brake cylinder 2 during the vehicle dynamics control operation. As discussed later, in the present embodiment, the front-left wheel-brake cyl-inder pressure and/or the rear-right wheel-brake cylinder pressure must be often kept constant at the pressure hold mode (in presence of the output of pressure-hold pulse signal) or reduced at the pressure reduction mode (in presence of the output of pressure-reduction pulse signal), even during operation of the pump 13A. During operation of the pump 13A, when the front-left wheel cylinder pressure must be kept constant, the hydraulic modulator 12 operates to switch the fluid-pressure control valves 21 and 25 to the shut-off positions. When the rear-right wheel cylinder pressure must be kept constant, the hydraulic modulator 12 operates to switch the fluid-pressure control valves 22 and 26 to the shut-off positions. When the front-left wheel cylinder pressure must be reduced, the hydraulic modulator 12 operates to switch the fluid-pressure control valve 21 to the shut-off position and simultaneously to switch the fluid-pressure control valve 25 to the full fluid-communication position. As a result, the brake fluid within the wheel cylinder 1 flows via the valve to the reservoir 16A and thus the fluid pressure within the wheel cylinder 1 is fallen. The pressure fall within the front-left wheel-brake cylinder 1 results in reduction in the braking force acting on the front-left road wheel or tire. When the rear-right wheel cylinder pressure must be reduced, the hydraulic modulator 12 operates to switch the fluid-pressure control valve 22 to the shut-off position and simultaneously to switch the fluid-pressure control valve 26 to the full fluid-communication position. As a result, the brake fluid within the wheel cylinder 2 flows via the valve 26 to the reservoir 16A and thus the fluid pressure within the wheel cylinder 2 is fallen. The pressure fall within the rear-right wheel-brake cylinder 2 results in reduction in the braking force acting on the rear-right road wheel or tire. The previously-noted two control pumps 13A and 13B, the two reservoirs 16A and 16B, and the pressure control valves 21 through 28 can be used in common with an anti-lock brake system often employed in earlier model cars. That is, each of the pumps 13A and 13b is able to serve as a return pump sometimes called an ABS pump.

The electronic control unit (C/U) 36 is hereinbelow described in greater detail by reference to FIGS. 2 and 4.

Figure 4:
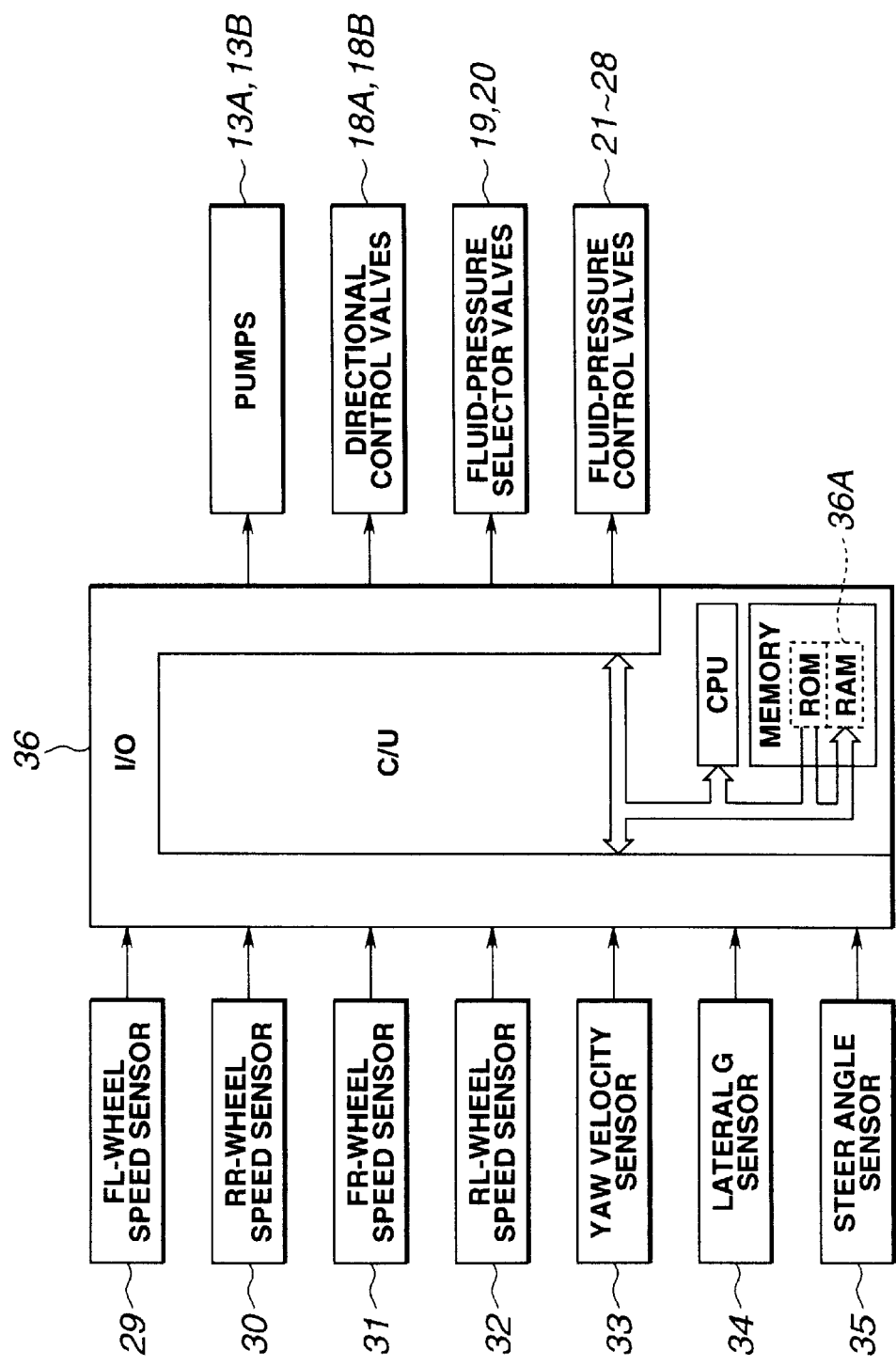
FIG. 4 is a block diagram of an electronic control unit (ECU or C/U) being applicable to the vehicle dynamics control system of the first embodiment.

As seen in FIG. 4, the control unit 36 usually comprises a microcomputer which is generally constructed by an input interface circuit including an analog-to-digital (A/D) converter for converting an analog input information or data, such as each sensor signal from various vehicle sensors, to a digital signal, a central processing unit (CPU), memories (ROM, RAM) for pre-storing programs as shown in FIGS. 5 through 11, and for permanently storing a predetermined, programmed information and for temporarily storing the results of ongoing arithmetic calculations, and an output interface circuit generally including a digital-to-analog (D/A) converter and a special driver to handle or drive a larger load, that is, the electro-magnetic solenoids of the valves 19 through 28, the solenoids of the valves 18A and 18B, and the pumps 13A and 13B each being comprised of a single-directional type electric-motor driven hydraulic pump. The previously-noted input and output interface circuits can be constructed individually, or in lieu thereof integrally formed as an input/output interface unit. In the shown embodiment, the control unit 36 includes an input/output interface unit. As shown in FIG. 2, vehicle sensors denoted by reference signs 29, 30, 31 and 32 are front-left, rear-right, front-right and rear-left wheel speed sensors for respectively monitoring front-left, rear-right, front-right and rear-left wheel speeds $V_{FL}$, $V_{RR}$, $V_{FR}$ and $V_{RL}$. Each of the wheel speed sensors 29 through 32 is a typical pick-up coil type sensor which operates on a pulse-counter principle. A vehicle sensor denoted by 33 is a yaw-velocity sensor for monitoring a yaw velocity Y of the vehicle. The yaw-velocity sensor 33 is generally constructed by an angular velocity sensor for example a tuning-fork type strain gauge, which monitors a Coriolis force. A vehicle sensor denoted by 34 is a lateral acceleration sensor for monitoring a lateral acceleration G exerted on the vehicle. The lateral acceleration sensor 34 is generally constructed by an acceleration sensor such as a cantilever type strain gauge. A vehicle sensor denoted by 35 is a steering angle sensor for monitoring a steering angle (or a steer angle) D. The steering angle sensor 35 is generally constructed by an optical sensor including a photo-transistor, a potentiometer, or the like. The previously-discussed vehicle sensors 29 through 35 serve as a vehicle behavior detector means. As seen in FIG. 4, the input interface of the input/output interface unit (I/O) of the electronic control unit 36 is connected to the vehicle sensors 29 through 35 for receiving the wheel-speed indicative input information, the yaw-speed indicative input information, the lateral-acceleration indicative input information, and the steering angle indicative input information. On the other hand, the output interface of the I/O is connected to the electric motors of the pumps 13A and 13B, the solenoids of the directional control valves 18A and 18B, and the solenoids of the fluid-pressure selector valves 19 and 20, and the solenoids of the fluid-pressure control valves 21–28, to output drive signals (or control signals or command signals) thereto. As discussed above, the computer memory section 36A of the control unit 36 includes a random access memory (RAM) and a read only memory (ROM) for storing input information for example a predetermined oversteer reference value YWOBS, a predetermined understeer reference value YWUBS (see steps S12 and S15 of FIG. 6 and steps S20 and S23 of FIG. 7), a data table of a target yaw-velocity Yd, a data table of a target vehicle slip angle Ad, a predetermined pressure build-up threshold value Pz, a predetermined pressure reduction threshold value Pg, preset pressure-reduction time intervals Ta and Tb, a predetermined time interval TINT, various constants necessary for arithmetic calculations or the like. The control unit 36 also includes pressure-reduction counters Ca and Cb, a pressure build-up counter Cz, and a pressure-reduction interval counter Cg. As set forth above, the computer input/output interface unit of the control unit 36 allows vehicle sensor's input information data ($V_{FL}$, $V_{RR}$, $V_{FR}$, $V_{RL}$, Y, G, D) to be understood by the central processing unit (CPU) and storable by the memory section 36A. Also, the input/output interface unit reconverts output data into a language that the output device (the solenoids of each of the valves 18A, 18B, 19–28, and the electric motors of the pumps 13A and 13B) can understand and comprehend. The arithmetic calculations (or the vehicle dynamics control routine) executed by the control unit 36 is hereinafter described in detail in accordance with the flow charts shown in FIGS. 5 through 11. This routine or program is executed as time-triggered interrupt routines to be triggered every predetermined time intervals.

Figure 5:
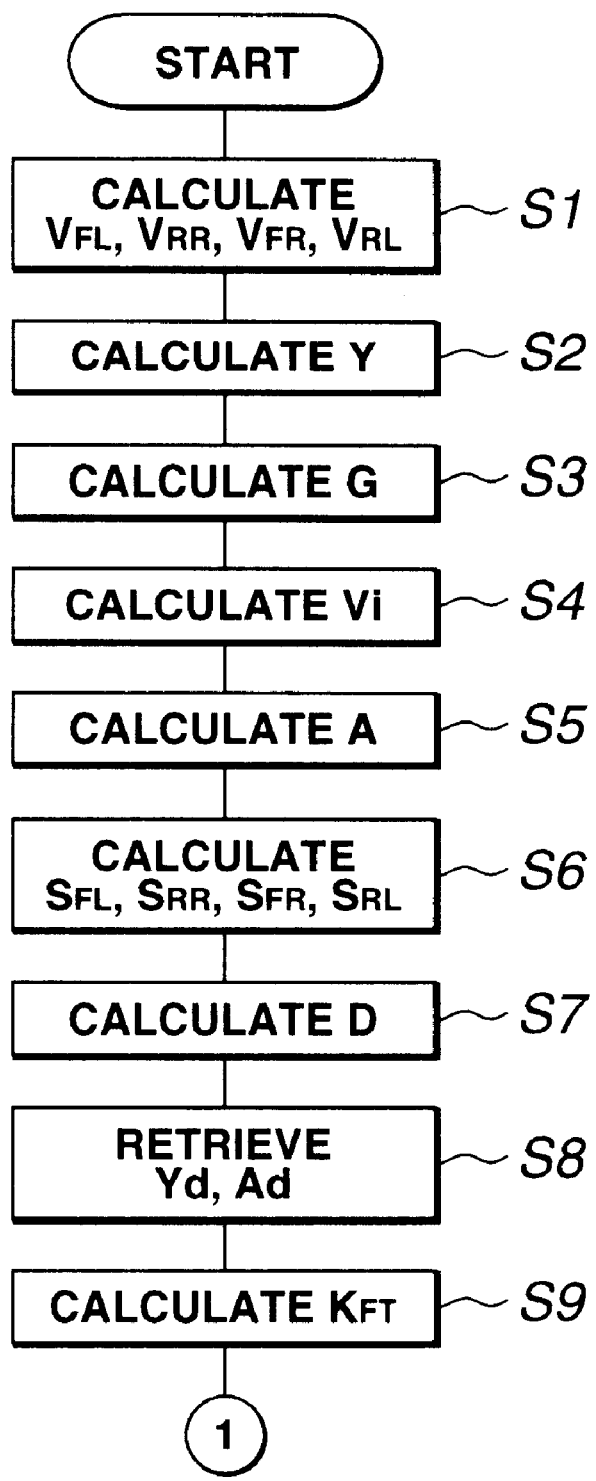
FIG. 5 is a flow chart illustrating a first series of steps (S1–S9) of a control routine (a vehicle dynamics control procedure) executed by a microcomputer employed in the control unit shown in FIG. 4.

Referring now to FIG. 5, there is shown a series of steps S1–S9 for arithmetically calculating basic data (i.e., wheel slip rates $S_{FL}$, $S_{RR}$, $S_{FR}$, $S_{RL}$, the target yaw velocity Yd, the target vehicle slip angle Ad, or the like) which is based on the vehicle sensor's input data and is necessary for the vehicle dynamics control discussed later. When the vehicle dynamics control routine is started during the vehicle running, first, in step S1, the wheel speeds $V_{FL}$, $V_{RR}$, $V_{FR}$ and $V_{RL}$ are calculated on the basis of the wheel speed sensor's input data. In step S2, the yaw velocity Y is calculated on the basis of the yaw-velocity sensor's input data. In step S3, the lateral acceleration G is calculated on the basis of the lateral-acceleration sensor's input data. In step S4, a vehicle speed Vi is calculated or estimated on the basis of the wheel speeds $V_{FL}$, $V_{RR}$, $V_{FR}$ and $V_{RL}$. In step S5, a vehicle slip angle A is calculated on the basis of the calculated yaw velocity Y, the calculated lateral acceleration G, and the calculated vehicle velocity Vi for example in accordance with the following expression (1).

$$A = \int (G/Vi + Y) \tag{1}$$

where the vehicle slip angle A is defined as an angle between a target direction of vehicle motion determined depending on the steering input (the steering wheel angle) and an actual direction of vehicle travel. For example, if the target or intended direction of vehicle motion determined depending on the steering input is almost equal to the actual direction of the vehicle travel during a vehicle turn, the vehicle slip angle A is nearly zero degrees. During turns, the greater slippage of tires, the greater the vehicle slip angle A.

In step S6, slip rates $S_{FL}$, $S_{RR}$, $S_{FR}$ and $S_{RL}$ of the front-left, rear-right, front-right and rear-left road wheels are calculated on the basis of the wheel speeds $V_{FL}$, $V_{RR}$, $V_{FR}$ and $V_{RL}$, and the vehicle speed Vi from the following expressions (2-1, 2-2, 2-3, 2-4).

$$S_{FL} = (V_{FL} - Vi)/Vi \tag{2-1}$$

$$S_{RR} = (V_{RR} - Vi)/Vi \tag{2-2}$$

$$S_{FR} = (V_{FR} - Vi)/Vi \tag{2-3}$$

$$S_{RL} = (V_{RL} - Vi)/Vi \tag{2-4}$$

In step S7, the steering angle D is calculated on the basis of the steering-angle sensor's input data. In step S8, a target yaw velocity Yd is retrieved from a predetermined look-up table on the basis of both the calculated vehicle speed Vi and the calculated steering angle D, and a target vehicle slip angle Ad is retrieved from the other predetermined look-up table on the basis of the data Vi and D. Herein, the target yaw velocity Yd essentially corresponds to the angular velocity about the z-axis which velocity is obtained during a steady-state turn without any understeer or oversteer, that is, when the vehicle is traveling on an ideal locus-of-turn justly based on the steering input. The target yaw velocity Yd varies regularly depending on changes in the vehicle velocity Vi and changes in the steering angle D. Thus, the relationship between the vehicle velocity Vi, the steering angle D, and the target yaw velocity Yd is pre-stored in the computer memory 36A in the form of a predetermined look-up table. Similarly, the vehicle slip angle Ad essentially corresponds to the a vehicle slip angle which is obtained during a steady-state turn without any understeer or oversteer. The target vehicle slip angle Ad varies regularly depending on changes in the vehicle velocity Vi and changes in the steering angle D. Thus, the target vehicle slip angle (Ad), versus vehicle velocity and steering angle characteristic is pre-stored in the computer memory 36A in the form of a predetermined look-up table (or a map data). In step S9, a vehicle dynamics control parameter $K_{FT}$ is calculated on the basis of the yaw velocity Y, the target yaw velocity Yd, the vehicle slip angle A and the target vehicle slip angle Ad, from the following expression (3).

$$K_{FT} = K_1 \cdot (Yd - Y) + K_2 \cdot (Ad - A) \tag{3}$$

where $K_1$ and $K_2$ are predetermined weighting coefficients.

Figure 6:
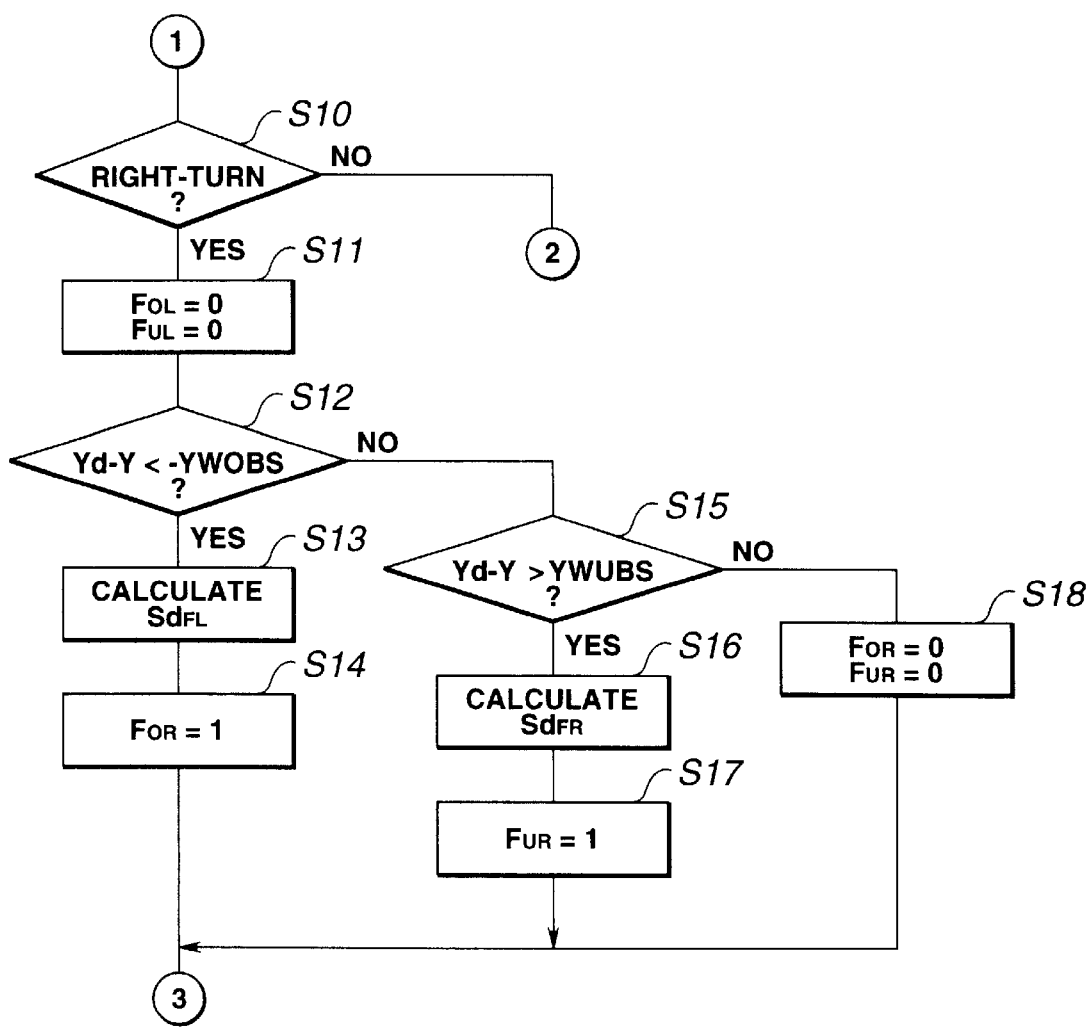
FIG. 6 shows a second series of steps (S10–S18) of the vehicle dynamics control routine following step S9 of FIG. 5.

Thereafter, a series of steps S10–S18 shown in FIG. 6 follow the arithmetic calculations of FIG. 5. Steps of FIG. 6 are provided for deciding whether a right-hand turn is made or a left-hand turn is made, and for deciding whether the vehicle is in a right-turn oversteer or in a right-turn understeer, and for calculating a target front-wheel slip rate Sd (namely a target front-left wheel slip rate $Sd_{FL}$ and a target front-right wheel slip rate $Sd_{FR}$) and for setting or resetting each of vehicle-behavior indicative flags $F_{OL}$, $F_{OR}$, $F_{UL}$ and $F_{UR}$, on the basis of the previously-noted decision results given at an execution cycle of the vehicle dynamics control routine. When the vehicle is in the right-turn oversteer state, only the flag $F_{OR}$ is set at "1". When the vehicle experiences understeer on a right turn, only the flag $F_{UR}$ is set at "1". When the vehicle experiences oversteer on a left turn, only the flag $F_{OL}$ is set at "1". When the vehicle is in the left-turn understeer state, only the flag $F_{UL}$ is set at "1". In step S10 of FIG. 6, a discrimination is made for example on the basis of the yaw velocity Y and the steering angle D as to whether a right-hand turn is made or a left-hand turn is made. The discrimination of step S10 may be made depending on the negative or positive sign of the lateral acceleration G. When step S10 decides that the right turn is made, that is when the answer to step S10 is in the affirmative (YES), step S11 is entered. In step S11, the vehicle-behavior indicative flags $F_{OL}$ and $F_{UL}$ (the left-turn oversteer indicative flag and the left-turn understeer indicative flag) are both reset to "0". In step S12, a test is made to determine whether the vehicle is in the right-turn oversteer state, on the basis of the following inequality (4).

$$Yd-Y<-YWOBS \qquad (4)$$

That is, in step S12, the yaw velocity Y is regarded as a positive value on a right-hand turn, and a test is made to determine whether the difference (Yd−Y) between the target yaw velocity Yd and the calculated yaw velocity Y is less than a predetermined negative oversteer reference value −YWOBS. The affirmative answer to step S12 means that the vehicle is in the right-turn oversteer state (see FIG. 15). Then, step S13 proceeds in which the target front-left wheel slip rate $Sd_{FL}$ is calculated on the basis of the slip rates $S_{FR}$ and $S_{RL}$, and the vehicle dynamics control parameter $K_{FT}$ calculated at step S9, from the following expression (5).

$$Sd_{FL}=S_{FR}-K_{FM}\cdot S_{RL}+(S_{LIM}/K_{FI})\cdot K_{FT} \qquad (5)$$

where $K_{FM}$ is a predetermined front-and-rear car weight-distribution characteristic constant, $K_{FI}$ is a front-wheel load/inertia characteristic constant, and $S_{LIM}$ is a maximum slip rate which is determined on the assumption that the slip rate and the braking force change linearly to each other.

In the previously-noted expression (5), the front-right wheel slip rate $S_{FR}$ and the rear-left wheel slip rate $S_{RL}$ are used for arithmetic calculation of the target front-left wheel slip rate SdFL necessary to compensating for oversteer tendencies during the right turn. This is because there is a possibility that a skid or slip of each of the front-right and rear-left road wheels have a great influence on the target front-left wheel slip rate $Sd_{FL}$ necessary for the vehicle dynamics control during the right-turn oversteer. That is to say, a slip of the front-right road wheel acts to negate the target front-left wheel slip rate $Sd_{FL}$. On the contrary, a slip of the rear-left road wheel acts to assist the target front-left wheel slip rate $Sd_{FL}$. Thus, assuming that the diagonally-opposed front-left and rear-right wheel-brake cylinders 1 and 2 are subjected to the vehicle dynamics control (precisely the vehicle-dynamics regulating brake-fluid pressure control), the rotating or skidding conditions of the other diagonally-opposed pair, namely the front-right and rear-left wheel-brake cylinders 3 and 4, may exert a great influence on the yawing moment about the z-axis of the vehicle. For the reasons discussed above, the system of the embodiment utilizes the target front-left wheel slip rate $Sd_{FL}$ given by the expression (5), in order to compensate for the yawing moment acting on the vehicle in the right-turn oversteer state, accounting for both the slip rates $S_{FR}$ and $S_{RL}$ of the other diagonally-opposed pair (the wheel cylinders 3 and 4). Also, the predetermined front-and-rear car weight-distribution characteristic constant $K_{FM}$ is a correction factor which is determined accounting for a rear-to-front load transfer during braking. It is preferable that the following expression (6) is used in place of the previously-discussed expression (5).

$$Sd_{FL}=S_{FR}-K_G\cdot K_{FM}\cdot S_{RL}+(S_{LIM}/K_{FI})\cdot K_{FT} \qquad (6)$$

where $K_G$ is a lateral-acceleration dependent correction factor (a variable) which is determined depending on the lateral acceleration G detected by the lateral-acceleration sensor 34, accounting for a lateral load transfer during turns. The lateral-acceleration dependent correction factor $K_G$ is variable in such a manner as to be essentially proportional to an increase in the detected lateral acceleration G.

Thereafter, in step S14, the vehicle-behavior indicative flag $F_{OR}$ (the right-turn oversteer indicative flag) is set at "1", and the condition of the flag $F_{OR}$ is stored in the computer memory. That is, the condition of $F_{OR}=1$ means that the vehicle is in the right-turn oversteer state.

Returning to step S12, when the answer to step S12 is in the negative (NO), the processor determines that the vehicle is out of the right-turn oversteer state, and then step S15 occurs. In step S15, a test is made to determine whether the vehicle is in the right-turn understeer state, on the basis of the following inequality (7).

$$Yd-Y>YWUBS \qquad (7)$$

That is, in step S15, a test is made to determine whether the difference (Yd−Y) is greater than a predetermined positive understeer reference value YWUBS. The affirmative answer to step S15 means that the vehicle is in the right-turn understeer state (see FIG. 14). Thereafter, step S16 occurs. In step S16, the target front-right wheel slip rate $Sd_{FR}$ is calculated on the basis of the slip rates $S_{FL}$ and $S_{RR}$, and the vehicle dynamics control parameter $K_{FT}$, from the following expression (8).

$$Sd_{FR}=S_{FL}-K_{FM}\cdot S_{RR}+(S_{LIM}/K_{FI})\cdot K_{FT} \qquad (8)$$

A slip of the front-left road wheel acts to negate the target front-right wheel slip rate $Sd_{FR}$, while a slip of the rear-right road wheel acts to assist the target front-right wheel slip rate $Sd_{FR}$. Thus, assuming that the diagonally-opposed front-right and rear-left wheel-brake cylinders 3 and 4 are subjected to the vehicle dynamics control (precisely the vehicle-dynamics regulating brake-fluid pressure control), the rotating or skidding conditions of another diagonally-opposed pair, namely the front-left and rear-right wheel-brake cylinders 1 and 2, may exert a great influence on the yawing moment about the z-axis of the vehicle. For the reasons discussed above, the system of the embodiment utilizes the target front-right wheel slip rate $Sd_{FR}$ given by the expression (8), in order to compensate for the yawing moment acting on the vehicle in the right-turn understeer state, accounting for both the slip rates $S_{FL}$ and $S_{RR}$.

Preferably, the previously-explained expression (8) may be replaced with the following expression (9).

$$Sd_{FR}=K_G \cdot S_{FL}-K_{FM} \cdot S_{RR}+(S_{LIM}/K_{FI}) \cdot K_{FT} \qquad (9)$$

In this manner, in case that the system further accounts for the lateral load shift (the lateral acceleration G), the target front-right wheel slip rate $Sd_{FR}$ can be calculated more accurately.

Then, in step S17, the vehicle-behavior indicative flag $F_{UR}$ (the right-turn understeer indicative flag) is set at "1", and the condition of the flag $F_{UR}$ is stored in the computer memory. Returning to step S15, when the answer to step S15 is negative (NO), step S18 is entered. In step S18, the vehicle-behavior indicative flags $F_{OR}$ and $F_{UR}$ are both reset to "0".

Figure 7:
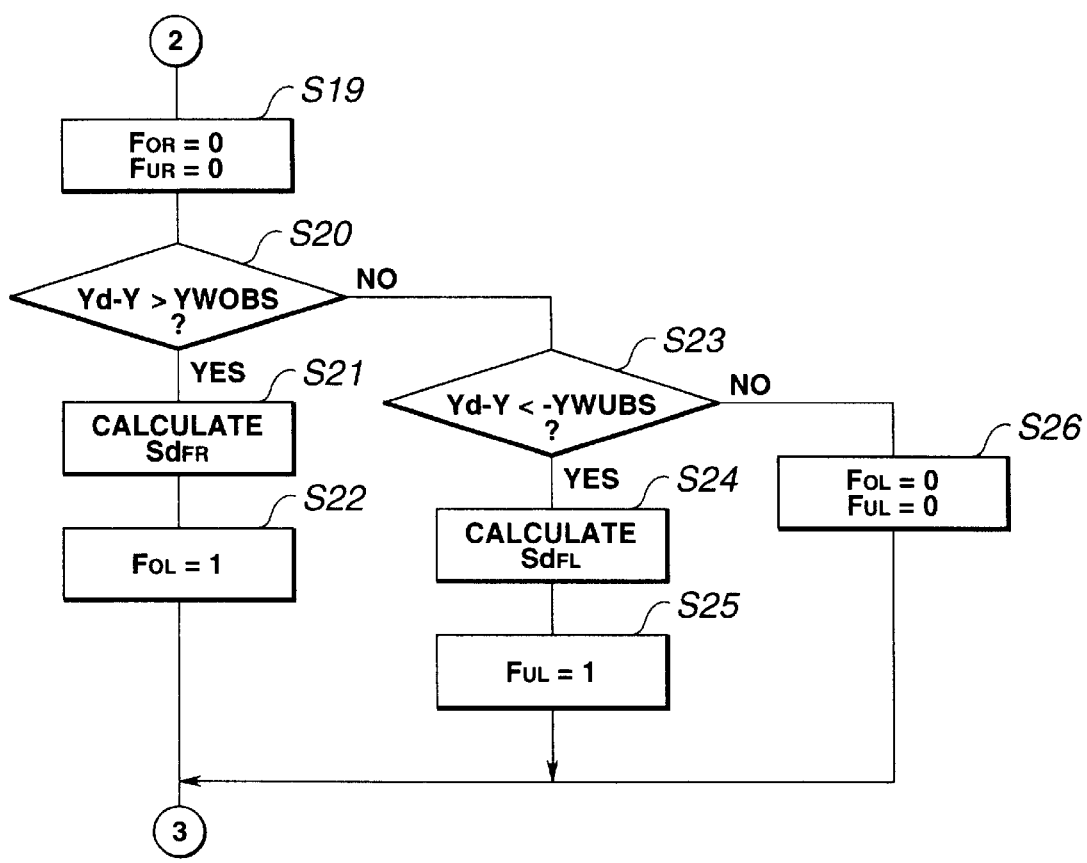
FIG. 7 shows a third series of steps (S19–S26) of the vehicle dynamics control routine following step S10 of FIG. 6.

Returning again to step S10, when the answer to step S10 is in the negative (NO), that is when the computer determines that the vehicle is in the left-turn state, a series of steps S19–S26 shown in FIG. 7 follow. Steps of FIG. 7 are provided for deciding whether the vehicle is in a left-turn oversteer or in a left-turn understeer, and for calculating the target front-left wheel slip rate $Sd_{FL}$ and the target front-right wheel slip rate $Sd_{FR}$ and for setting or resetting each of vehicle-behavior indicative flags $F_{OL}$, $F_{OR}$, $F_{UL}$ and $F_{UR}$, on the basis of the previously-noted decision results given at an execution cycle of the vehicle dynamics control routine. When step S10 determines that the right-hand turn is not made, the right-turn oversteer indicative flag $F_{OR}$ and the right-turn understeer indicative flag $F_{UR}$ are both reset to "0" at step S19. Thereafter, step S20 is entered. In step S20, a test is made to determine whether the vehicle is in the left-turn oversteer state, on the basis of the following inequality (10).

$$Yd-Y>YWOBS \qquad (10)$$

That is, in step S20, a test is made to determine whether the difference (Yd−Y) is greater than a predetermined positive oversteer reference value YWOBS. The affirmative answer to step S20 means that the vehicle is in the left-turn oversteer state (see FIG. 13), and thus step S21 occurs. In step S21, the target front-right wheel slip rate $Sd_{FR}$ is calculated on the basis of the slip rates $S_{FL}$ and $S_{RR}$, and the vehicle dynamics control parameter $K_{FT}$, from the following expression (11). Note that the expression (11) used in the left-turn oversteer state is identical to the expression (8) used in the right-turn understeer state.

$$Sd_{FR}=S_{FL}-K_{FM} \cdot S_{RR}+(S_{LIM}/K_{FI}) \cdot K_{FT} \qquad (11)$$

As appreciated, it is preferable that the expression (11) may be replaced by the following expression (12) being identical to the previously-noted expression (9), for more precise arithmetic calculation of the target front-right wheel slip rate $Sd_{FR}$.

$$Sd_{FR}=K_G \cdot S_{FL}-K_{FM} \cdot S_{RR}+(S_{LIM}/K_{FI}) \cdot K_{FT} \qquad (12)$$

Thereafter, step S22 is entered in which the left-turn oversteer indicative flag $F_{OL}$ is set at "1" to temporarily store that the vehicle is in the left-turn oversteer state. Conversely, when the answer to step S20 is in the negative (NO), step S23 occurs. In step S23, a test is made to determine whether the vehicle is in the left-turn understeer state, on the basis of the following inequality (13).

$$Yd-Y<-YWUBS \qquad (13)$$

That is, in step S23, a test is made to determine whether the difference (Yd−Y) is less than a predetermined negative understeer reference value −YWUBS. The affirmative answer to step S23 means that the vehicle is in the left-turn understeer state (see FIG. 12). Thereafter, step S24 occurs. In step S24, the target front-left wheel slip rate $Sd_{FL}$ is calculated on the basis of the slip rates $S_{FR}$ and $S_{RL}$, and the vehicle dynamics control parameter $K_{FT}$, from the following expression (14). Note that the expression (14) used in the left-turn understeer state is identical to the expression (5) used in the right-turn oversteer state.

$$Sd_{FL}=S_{FR}-K_{FM} \cdot S_{RL}+(S_{LIM}/K_{FI}) \cdot K_{FT} \qquad (14)$$

Preferably, the expression (14) may be replaced by the following expression (15) being identical to the previously-noted expression (6), for more precise arithmetic calculation of the target front-left wheel slip rate $Sd_{FL}$.

$$Sd_{FR}=K_G \cdot S_{FL}-K_{FM} \cdot S_{RR}+(S_{LIM}/K_{FI}) \cdot K_{FT} \qquad (15)$$

After step S24, step S25 follows. In step S25, the left-turn understeer indicative flag $F_{UL}$ is set at "1" and at the same time the condition of $F_{UL}=1$ is temporarily stored in the computer RAM memory. Returning to step S23, when the answer to step S23 is negative (NO), step S26 occurs. In step S26, the left-turn oversteer indicative flag $F_{OL}$ and the left-turn understeer indicative flag $F_{UL}$ are both reset to "0".

Figure 8:
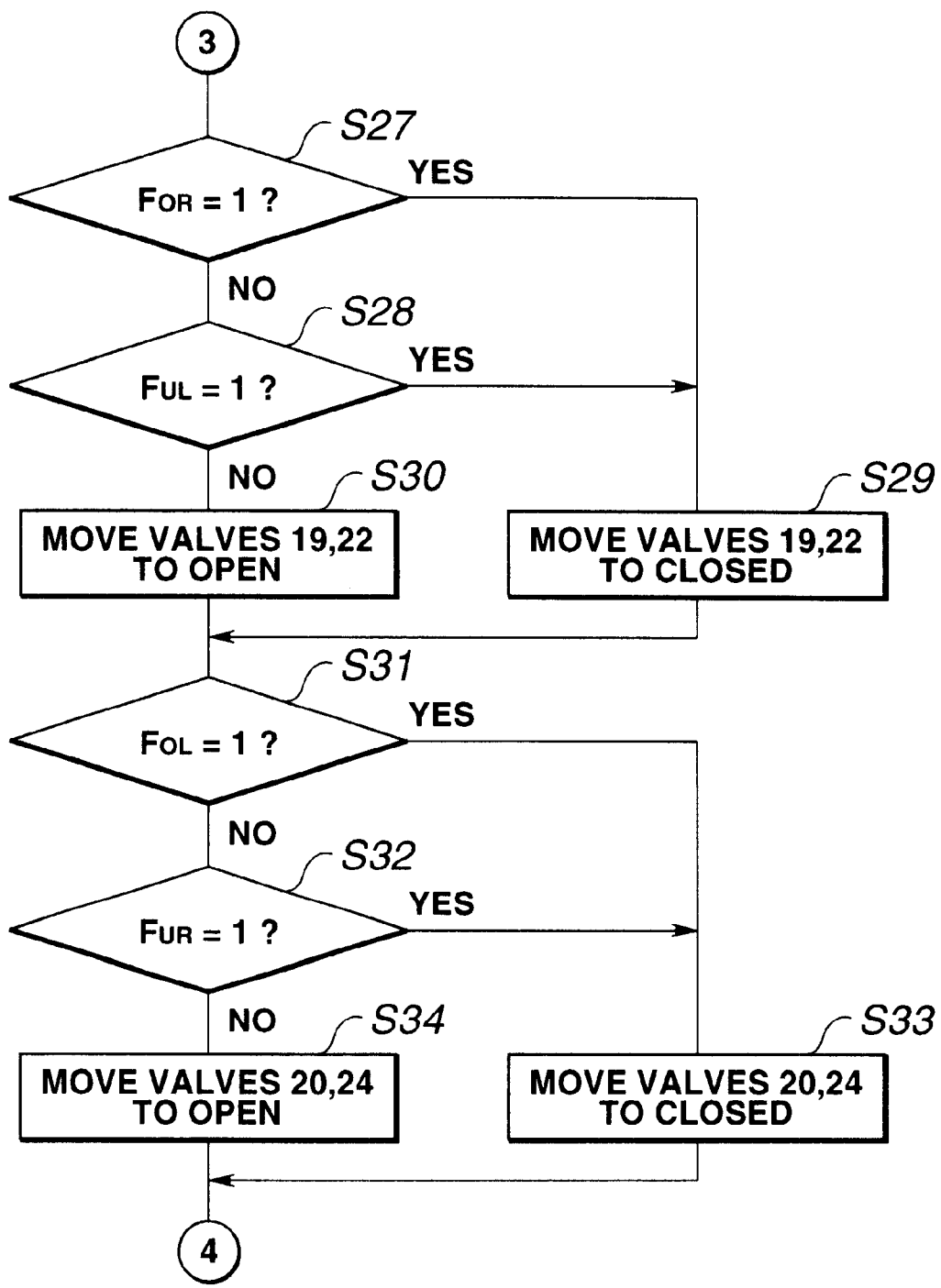
FIG. 8 shows a fourth series of steps (S27–S34) of the vehicle dynamics control routine following either steps S14, S17, or S18 of FIG. 6, or steps S22, S25, or S26 of FIG. 7.

After completion of setting or resetting the each of the vehicle-behavior indicative flags $F_{OR}$, $F_{UR}$, $F_{OL}$, and $F_{UL}$, that is, after steps S14, S17 or S18 in FIG. 6 or after steps S22, S25 or S26 in FIG. 7, step S27 of FIG. 8 occurs. A series of steps S27–S34 of FIG. 8 are provided for properly driving or controlling the fluid-pressure selector valves 19 and 20, and the fluid-pressure control valves 22 and 24, in response to the state conditions of the four vehicle-behavior indicative flags $F_{OR}$, $F_{UR}$, $F_{OL}$, and $F_{UL}$, and consequently for selecting a required fluid pressure to be directed to the first brake line 5 from between the brake-fluid pressure output from the primary master-cylinder outlet port and the brake-fluid pressure output from the control pump 13A and simultaneously for selecting a required fluid pressure to be directed to the second brake line 6 from between the brake-fluid pressure output from the secondary master-cylinder outlet port and the brake-fluid pressure output from the controlpump 13B. In step S27 of FIG. 8, a test is made to determine whether the right-turn oversteer indicative flag $F_{OR}$ is set at "1". When the answer to step S27 is in the affirmative (YES), step S29 occurs. Conversely when the answer to step S27 is in the negative (NO), step S28 is entered. In step S28, a test is made to determine whether the left-turn understeer indicative flag $F_{UL}$ is set at "1". When the answer to step S28 is affirmative, step S29 occurs. In step S29, the fluid-pressure selector valve 19 and the fluid-pressure control valve 22 are both moved to their shut-off positions. This inhibits the master-cylinder pressure from being directed from the primary master-cylinder outlet port to the first brake line 5, and permits the pumped and regulated fluid pressure to be directed from the control pump 13A to the first brake line 5. The flow from step S27 to step S29 contributes to an increase in a yawing moment about the z-axis, negative clockwise (anti-clockwise) when looking in the positive direction of the z-axis, and whereby the right-turn oversteer tendency can be adjusted or regulated toward neutral steer (see FIG. 15). The flow from step S28 to step S29 contributes to an increase in a yawing moment about the z-axis, anti-clockwise when looking in the positive direction of the z-axis, and whereby the left-turn understeer tendency can be adjusted or regulated toward neutral steer (see FIG. 12). When the answers to steps S27 and S28 are negative (NO), that is, when the vehicle is in neither right-turn oversteer nor left-turn understeer, step S30 occurs. In step S30, the fluid-pressure selector valve 19 and the fluid-pressure control valve 22 are both maintained at their full fluid-communication positions shown in FIG. 3. This permits the master-cylinder pressure to be directed from the primary master-cylinder outlet port to the first brake line 5 connected to the diagonally-opposed wheel-brake cylinders 1 and 2. Thereafter, in step S31, a test is made to determine whether the left-turn oversteer indicative flag $F_{OL}$ is set at "1". When the answer to step S31 is affirmative, step S33 occurs. Conversely, when the answer to step S31 is negative, step S32 occurs. In step S32, a test is made to determine whether the right-turn understeer indicative flag $F_{UR}$ is set at "1". When the answer to step S32 is affirmative, step S33 is entered. In step S33, the fluid-pressure selector valve 20 and the fluid-pressure control valve 24 are both shifted to their shut-off positions. This inhibits the master-cylinder pressure from being directed from the secondary master-cylinder outlet port to the second brake line 6, and permits the pumped and regulated fluid pressure to be directed from the control pump 13B to the second brake line 6. The flow from step S31 to step S33 contributes to an increase in a yawing moment about the z-axis, positive clockwise when looking in the positive direction of the z-axis, and whereby the left-turn oversteer tendency can be adjusted or regulated toward neutral steer (see FIG. 13). The flow from step S32 to step S33 contributes to an increase in a yawing moment about the z-axis, positive clockwise when looking in the positive direction of the z-axis, and whereby the right-turn understeer can be adjusted or regulated toward neutral steer. When the answers to steps S31 and S32 are negative, that is, when the vehicle is in neither left-turn oversteer nor right-turn understeer, step S34 is entered. In step S34, the fluid-pressure selector valve 20 and the fluid-pressure control valve 24 are both maintained at their full fluid-communication positions shown in FIG. 3. This permits the master-cylinder pressure to be directed from the secondary master-cylinder outlet port to the second brake line 6 connected to the diagonally-opposed wheel-brake cylinders 3 and 4.

As explained above, when the vehicle is in the right-turn oversteer state or in the left-turn understeer state, the system permits the pumped and regulated fluid pressure to be fed from the pump 13A to the first brake line 5 and simultaneously permits the master-cylinder pressure to be fed from the secondary master-cylinder outlet port to the second brake line 6. In the presence of fluid communication between the discharge port of the pump 13A and the first brake line 5, the fluid pressure within the front-left wheel-brake cylinder 1 is properly regulated by way of the fluid-pressure control valves 21 and 25 associated with the wheel cylinder 1. Also, the fluid pressure within the rear-right wheel-brake cylinder 2 is properly regulated by way of the fluid-pressure control valve 26. On the other hand, the fluid pressures within the diagonally-opposed wheel-brake cylinders 3 and 4 connected to the second brake line 6 vary in response to the amount of depression of the brake pedal 7.

Similarly, when the vehicle is in the left-turn oversteer state or in the right-turn understeer state, the system permits the pumped and regulated fluid pressure to be fed from the pump 13B to the second brake line 6 and simultaneously permits the master-cylinder pressure to be fed from the primary master-cylinder outlet port to the first brake line 5. In the presence of fluid communication between the discharge port of the pump 13B and the second brake line 6, the fluid pressure within the front-right wheel-brake cylinder 3 is properly regulated by way of the fluid-pressure control valves 23 and 27 associated with the wheel cylinder 3. Also, the fluid pressure within the rear-left wheel-brake cylinder 4 is properly regulated by way of the fluid-pressure control valve 28. On the other hand, the fluid pressures within the diagonally-opposed wheel-brake cylinders 1 and 2 connected to the first brake line 5 vary in response to the amount of depression of the brake pedal 7.

When the vehicle is out of all of the right-turn oversteer state, the left-turn oversteer state, the right-turn understeer state and the left-turn understeer state, in other words, when the vehicle is essentially in the neutral steer state on turns, the normally-open solenoid valves, namely the valves 19, 20, 21, 22, 23 and 24, are all maintained at the fluid-communication positions, while the normally-closed solenoid valves, namely the valves 25, 26, 27 and 28 are all maintained at the shut-off positions. As a matter of course, when the vehicle dynamics control is not executed, the directional control valves 18A and 18B (the normally-closed type) are both maintained at the shut-off positions. Under these conditions, the system permits the master-cylinder pressure to be fed from the primary and secondary master-cylinder outlet ports to the respective brake lines 5 and 6, so that the fluid pressure in each individual brake-wheel cylinder varies in response to the amount of depression of the brake pedal 7.

Figure 9:
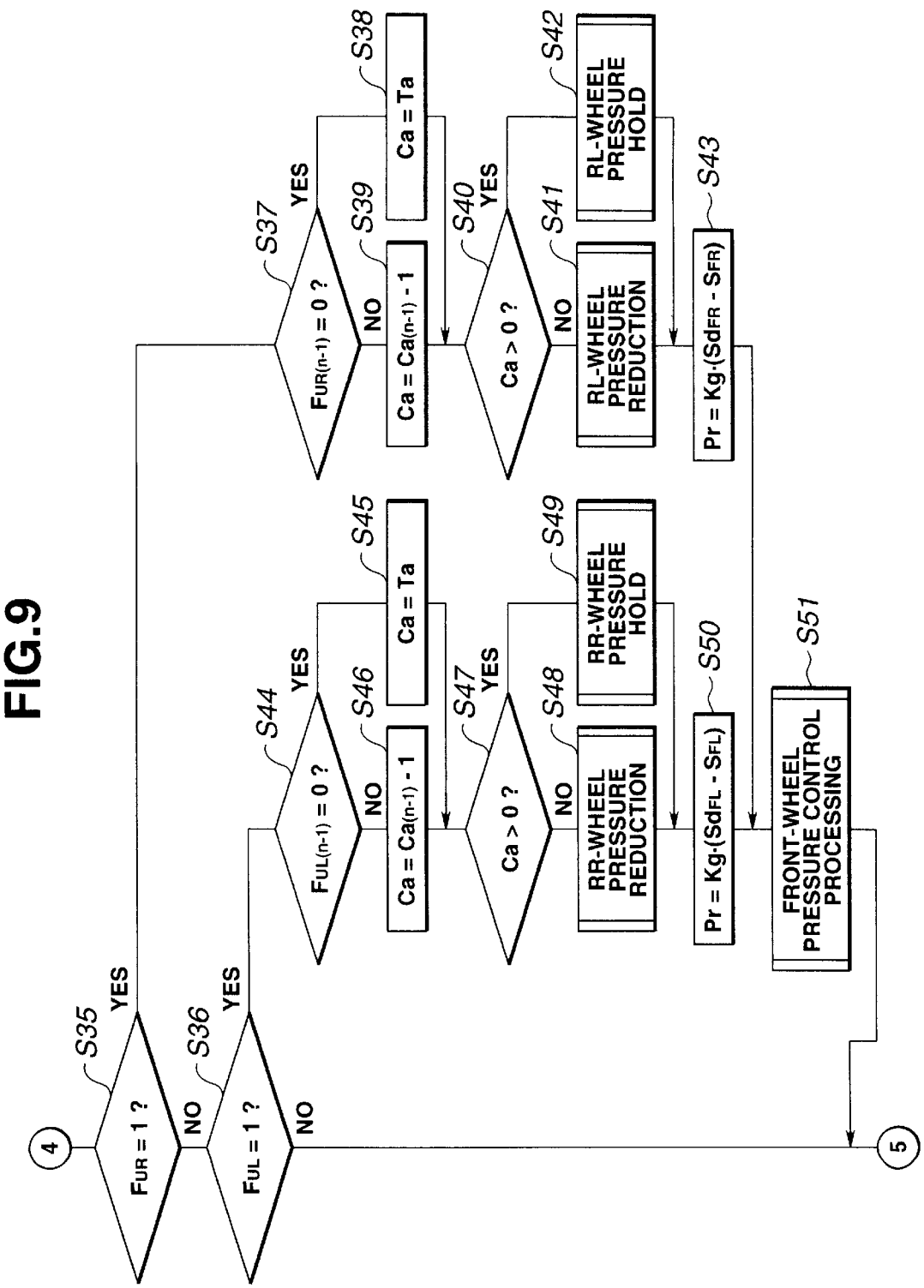
FIG. 9 shows a fifth series of steps (S35–S51) of the vehicle dynamics control routine following either steps S33 or S34 of FIG. 8.

Subsequently to steps S33 and S34 of FIG. 8, a series of steps S35–S51 of FIG. 9 follow. Steps S35–S51 of FIG. 9 are provided for reducing the fluid pressure within the outer rear wheel-brake cylinder down to the minimum value to compensate for undesired left-turn understeer or right-turn understeer (see FIGS. 12 and 14), and for properly regulating the fluid pressure within the inner front wheel-brake cylinder by adjusting the pressure level of brake fluid delivered from the pump 13A to the brake line 5 by the two valves 21 and 25 or by adjusting the pressure level of brake fluid delivered from the pump 13B to the brake line 6 by the two valves 23 and 27. The flow chart shown in FIG. 9 is hereinbelow described in detail.

In step S35, a test is made to determine whether the right-turn understeer indicative flag $F_{UR}$ is set at "1". When the answer to step S35 is affirmative (YES), step 37 occurs. In step S37, a test is made to determine whether the previous value $F_{UR(n-1)}$ of the right-turn understeer indicative flag is reset to "0". When the current value $F_{UR(n)}$ (simply $F_{UR}$) of the right-turn understeer indicative flag is set and the previous value $F_{UR(n-1)}$ is reset, i.e., in case of $F_{UR(n)}=1$ and $F_{UR(n-1)}=0$, the CPU of the computer determines that the vehicle's cornering behavior begins to shift to the right-turn understeer state at the current cycle of the vehicle dynamics control program. Then, step S38 is entered in which the "count" value of the pressure-reduction counter Ca is set at a predetermined pressure-reduction time duration Ta. Thereafter, step S40 occurs. When the answer to step S37 is negative, step S39 occurs. When the current value $F_{UR}$ of the right-turn understeer indicative flag is set and the previous value $F_{UR(n-1)}$ is also set, i.e., in case of $F_{UR(n)}=1$ and $F_{UR}(n-1)=1$, the CPU determines that the vehicle's cornering behavior is maintained in the right-turn understeer state at between the previous and current execution cycles. In step S39, the previous "count" value $Ca_{(n-1)}$ of the pressure-reduction counter is decremented by "1", and the current "count" value $Ca_{(n)}$ (simply Ca) is updated by the decremented "count" value Ca(n−1)−1. Then, step S40 proceeds. In step S40, a test is made to determine whether the current "count" value Ca is greater than "0". In case of Ca>0, step S41 is entered. In step S41, the control unit operates to reduce the fluid pressure in the rear-left wheel-brake cylinder 4 (the outer rear wheel-brake cylinder). That is, in the right-turn understeer state, the control unit shifts the fluid-pressure control valve 24 to the shut-off position and then shifts the fluid-pressure control valve 28 to the full fluid-communication position, thereby permitting the flow of brake fluid in the wheel cylinder 4 into the secondary reservoir 16B. This reduces the fluid pressure in the wheel cylinder 4. When the answer to step S40 is negative (NO), i.e., in case of Ca≦0, step S42 is entered. In this manner, when the condition of Ca<0 is satisfied, the CPU determines that the predetermined pressure-reduction time duration Ta has been elapsed after setting the "count" value Ca at the predetermined value Ta. Thus, in step S42, the control unit operates to hold the fluid pressure in the rear-left wheel-brake cylinder 4 (the outer rear wheel-brake cylinder). That is, as soon as the predetermined pressure-reduction time duration Ta has been elapsed, the control unit shifts the fluid-pressure control valve 28 again to the shut-off position, while holding the fluid-pressure control valve 24 at the shut-off position. As a result, the fluid pressure in the wheel cylinder 4 is held at the minimum fluid pressure level (for example zero). In other words, the braking force acting on the outer rear wheel (the rear-left road wheel) is held at the minimum value. Thereafter, step S43 occurs. In step S43, a required controlled-pressure value Pr for the front-right wheel-brake cylinder 3 is calculated from the following expression (16), by multiplication of the difference ($Sd_{FR} - S_{FR}$) with a predetermined control gain Kg.

$$Pr = Kg \cdot (Sd_{FR} - S_{FR}) \tag{16}$$

where $Sd_{FR}$ is the target front-right wheel slip rate (see step S16 of FIG. 6) and $S_{FR}$ is the calculated front-right wheel slip rate (see step S6 of FIG. 5).

Returning to step S35, when the answer to step S35 is negative (NO), step S36 occurs. In step S36, a test is made to determine whether the left-turn understeer indicative flag $F_{UL}$ is set at "1". When the left-turn understeer indicative flag $F_{UL}$ is set at "1", the procedure flows from step S36 to step S44. Steps S44–S49 related to the rear-right wheel-brake cylinder pressure control (the outer rear wheel-brake cylinder pressure control) are similar to the previously-noted steps S37–S42 related to the rear-left wheel-brake cylinder pressure control. That is, the brake-fluid pressure in the rear-right wheel-brake cylinder 2 is reduced until the preset pressure-reduction time interval Ta has been elapsed, and then the rear-right wheel cylinder pressure is kept at the minimum fluid pressure level (for example zero). Thereafter, step S50 is entered. In step S50, a required controlled-pressure value Pr for the front-left wheel-brake cylinder 1 is calculated from the following expression (17), by multiplication of the difference ($Sd_{FL} - S_{FL}$) with the predetermined control gain Kg.

$$Pr = Kg \cdot (Sd_{FL} - S_{FL}) \tag{17}$$

where $Sd_{FL}$ is the target front-left wheel slip rate (see step S13 of FIG. 6) and $S_{FL}$ is the calculated front-left wheel slip rate (see step S6 of FIG. 5).

Figure 10:
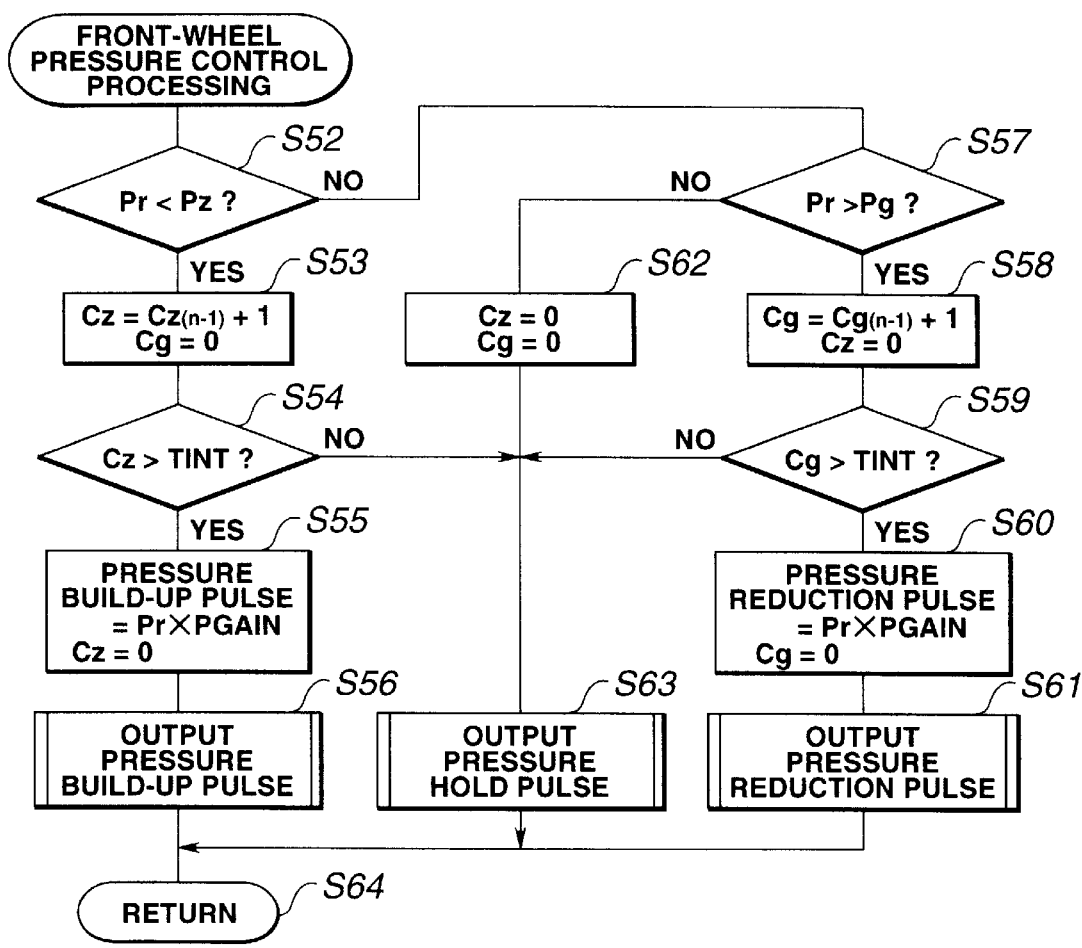
FIG. 10 shows a pre-defined sub-routine executed in step S51 of FIG. 9 or in step S81 of FIG. 11.

After steps S43 or S50, step S51 occurs. In step S51, a front-wheel pressure control processing is executed in accordance with the flow chart shown in FIG. 10. In the front-wheel pressure control processing of FIG. 10, when the control unit determines that the vehicle is in the right-turn understeer state, the fluid-pressure control valves 23 and 27 both associated with the front-right wheel-brake cylinder 3, and the fluid-pressure control pump 13B are all controlled or driven in response to the pressure build-up pulse signal (see steps S55 and S56), the pressure hold pulse signal (see steps S63), or the pressure reduction pulse signal (see step S60 and S61). During the right-turn understeer, as appreciated from steps S55 and S60 of FIG. 10, the pressure build-up pulse signal and the pressure reduction pulse signal are based on the required controlled-pressure value Pr for the front-right wheel-brake cylinder 3. Alternatively, while the pressure hold pulse signal (see step S63 of FIG. 10) is output to the fluid-pressure control valves 23 and 27 during the right-turn understeer, the two valves 23 and 27 remain fully closed to hold the front-right wheel cylinder pressure at a constant value. On the other hand, when the control unit determines that the vehicle is in the left-turn understeer state, the fluid-pressure control valves 21 and 25 both associated with the front-left wheel-brake cylinder 1, and the fluid-pressure control pump 13A are all controlled or driven in response to the pressure build-up pulse signal (see steps S55 and S56), the pressure hold pulse signal (see steps S63), or the pressure reduction pulse signal (see step S60 and S61). During the left-turn understeer, as appreciated from steps S55 and S60 of FIG. 10, the pressure build-up pulse signal and the pressure reduction pulse signal are based on the required controlled-pressure value Pr for the front-left wheel-brake cylinder 1. Alternatively, while the pressure hold pulse signal (see step S63 of FIG. 10) is output to the fluid-pressure control valves 21 and 25 during the left-turn understeer, the two valves 21 and 25 remain fully closed to hold the front-left wheel cylinder pressure at a constant value. Details of steps S52–S64 shown in FIG. 10 are hereinbelow exemplified or explained only in the left-turn understeer state condition, for the purpose of simplification of the disclosure.

In step S52, a test is made to determine whether the required controlled-pressure value Pr for the front-left wheel-brake cylinder 1 is less than a predetermined pressure build-up threshold value Pz. The required controlled-pressure value Pr less than the predetermined pressure build-up threshold value Pz means that the front-left wheel slip rate $S_{FL}$ does not yet reach the target front-left wheel slip rate $Sd_{FL}$, and thus it is necessary to build-up the fluid pressure in the front-left wheel-brake cylinder 1. Thus, when the answer to step S52 is affirmative (YES), i.e., in case of Pr<Pz, the procedure flows via step S53 to step S54. In step S53, the pressure build-up counter Cz is incremented by "1", while the pressure-reduction counter Cg is reset at "0". In step S54, a test is made to determine whether the "count" value of the pressure build-up counter Cz is greater than the predetermined time interval TINT such as 30 msec. In case of Cz>TINT, steps S55 and S56 follow to execute a fluid-pressure build-up processing for the front-left wheel-brake cylinder 1. The previously-noted comparison step S54 between the pressure build-up counter value Cz and the predetermined time interval TINT is provided for cyclically operating the front-left wheel-brake cylinder at its pressure build-up mode every predetermined time intervals TINT. This is because, usually, the rotational speed of the front-left road wheel does not change at the same time when the pressure build-up control or the pressure-reduction control for the front-left wheel-brake cylinder 1 is started, and thus there is a slight time delay between a change in the front-left wheel speed and the beginning of the pressure build-up or pressure-reduction control for the front-left wheel-brake cylinder 1. Therefore, the control unit must determine the next proper control mode from among the pressure build-up, pressure-reduction and pressure-hold modes, while monitoring changes (decrease or increase) in the front-left wheel speed based on the pressure build-up or pressure-reduction controls. In step S55, a pressure build-up pulse signal value is determined by multiplication of the required controlled-pressure value Pr for the front-left wheel-brake cylinder 1 with a predetermined pulse conversion coefficient PGAIN from the following expression (18).

$$\text{Pressure build-up pulse} = Pr \cdot PGAIN \qquad (18)$$

At the same time, in step S55, the pressure build-up counter value Cz is reset at "0".

Thereafter, step S56 is entered in which control signals based on the pressure build-up pulse signal value are output to the solenoids of the fluid-pressure control valves 21 and 25, and the electric motor of the pump 13A. In more detail, during the left-turn understeer (i.e., $F_{UL}=1$), the system permits the fluid-pressure supply from the pump 13A to the first brake line 5 with the fluid-pressure selector valve 19 and the fluid-pressure control valve 22 kept closed. At the same time, in response to the pressure build-up pulse, the fluid-pressure control valve 21 is switched to the fluid-communication position and the fluid-pressure control valve 25 is switched to the shut-off position, and then the pump 13A is driven. As a result, the pressurized brake fluid generated by the pump 13A is delivered via the valve 21 to the front-left wheel-brake cylinder 1 and the front-left wheel cylinder pressure is built up, thereby increasing the braking force of the front-left road wheel.

On the contrary, when the answer to step S52 is negative (NO), in case of $Pr \geq Pz$, step S57 occurs. In step S57, a test is made to determine whether the required controlled-fluid pressure for the front-left wheel-brake cylinder 1 is greater than a predetermined pressure-reduction threshold value Pg. The required controlled-pressure value Pr greater than the predetermined pressure-reduction threshold value Pg means that the front-left wheel slip rate $S_{FL}$ exceeds the target front-left wheel slip rate $Sd_{FL}$, and thus it is necessary to reduce the fluid pressure in the front-left wheel-brake cylinder 1. Thus, when the answer to step S57 is affirmative (YES), i.e., in case of Pr>Pg, the procedure flows via step S57 to step S58. In step S58, the pressure-reduction counter Cg is incremented by "1", while the pressure build-up counter Cz is reset at "0". In step S59, a test is made to determine whether the "count" value of the pressure-reduction counter Cz is greater than the predetermined time interval TINT. In case of Cg>TINT, steps S60 and S61 follow to execute a fluid-pressure reduction processing for the front-left wheel-brake cylinder 1. The previously-noted comparison step S59 between the pressure-reduction counter value Cg and the predetermined time interval TINT is provided for cyclically operating the front-left wheel-brake cylinder at its pressure-reduction mode every predetermined time intervals TINT. The control unit determines the next proper control mode from among the pressure build-up, pressure-reduction and pressure-hold modes, while monitoring changes (decrease or increase) in the front-left wheel speed based on the pressure-change control. In step S60, a pressure-reduction pulse signal value is determined by multiplication of the required controlled-pressure value Pr for the front-left wheel-brake cylinder 1 with a predetermined pulse conversion coefficient PGAIN from the following expression (19).

$$\text{Pressure-reduction pulse} = Pr \cdot PGAIN \qquad (19)$$

At the same time, in step S60, the pressure-reduction counter value Cg is reset at "0".

Thereafter, step S61 is entered in which control signals based on the pressure-reduction pulse signal value are output to the solenoids of the fluid-pressure control valves 21 and 25, and the electric motor of the pump 13A. In more detail, in the presence of output the pressure-reduction pulse, the pump 13A is stopped, and then the fluid-pressure control valve 21 is switched to the shut-off position and the fluid-pressure control valve 25 is switched to the fluid-communication position. As a result, the brake fluid within the front-left wheel-brake cylinder 1 is directed via the valve 25 toward the primary reservoir 16A and thus the front-left wheel cylinder pressure is reduced, thereby decreasing the braking force of the front-left road wheel.

Returning to step S57, when the answer to step S57 is negative (NO), i.e., in case of $Pr \leq Pg$, steps S62 and S63 follow to hold the fluid pressure in the front-left wheel-brake cylinder constant. In step S62, pressure build-up counter value Cz and the pressure-reduction counter value Cg are both reset at "0". Thereafter, step S63 is entered. Also, when the answer to steps S54 or S59 is negative, step S63 occurs. In step S63, the control unit outputs control signals based on a predetermined pressure-hold pulse signal value to switch the two valves 21 and 25 associated with the front-left wheel cylinder 1 to their shut-off positions. The output of control signals based on the predetermined pressure-hold maintains the fluid pressure in the front-left wheel cylinder 1 at the current pressure level. After steps S56, S61 or S63, step S64 occurs in which the procedure returns from the front-wheel pressure control sub-routine to the main program (the background routine for the vehicle dynamics control). As can be appreciated from the front-wheel pressure control processing (steps S52–S64) shown in FIG. 10, when the vehicle is in the left-turn understeer state, the fluid pressure in the wheel-brake cylinder corresponding to the inner front road wheel (that is, the front-left wheel-brake cylinder pressure) is properly increased in response to the required controlled-pressure value Pr, with the result that the braking force of the inner front road wheel is increased.

As previously discussed by reference to the expression (17), the required controlled-pressure value Pr is given by multiplication of the difference between the target front-left wheel slip rate $Sd_{FL}$ and the calculated front-wheel slip rate $S_{FL}$ with the predetermined control gain Kg. As may be appreciated, the greater the degree of the left-turn understeer, the greater the difference $(Sd_{FL}-S_{FL})$, thus increasing the required controlled-pressure value Pr. As soon as the understeer tendency increases and thus the deviation from the target slip rate $Sd_{FL}$ exceeds the predetermined pressure build-up threshold value Pz, the inner front wheel cylinder pressure, which corresponds to the front-left wheel-brake cylinder pressure during the left-turn understeer, is suitably increased by way of the flow from step S52, through steps S53–S55 to step S56, depending on the degree of understeer on the left turn. As a result, the braking force of the front-left wheel is increased depending on the degree of understeer during the left turn. This effectively compensates for the yawing moment acting on the vehicle during the left-turn understeer state, and regulates the vehicle's cornering behavior toward neutral steer. Additionally, in the left-turn understeer state, the front-left wheel-brake cylinder 1 is cyclically operated at either one of the three modes, namely the pressure build-up mode, the pressure-reduction mode, or the pressure-hold mode, every predetermined time intervals TINT, while monitoring a change in the front-left wheel cylinder pressure. Therefore, the braking force of the front-left road wheel (or the front-left wheel-brake cylinder pressure) can be suitably increased to such an extent that the left-turn understeer state is avoided. The cyclic selection of the pressure control mode prevents generation of excessive fluid pressure in the front-left wheel-brake cylinder 1.

Figure 11:
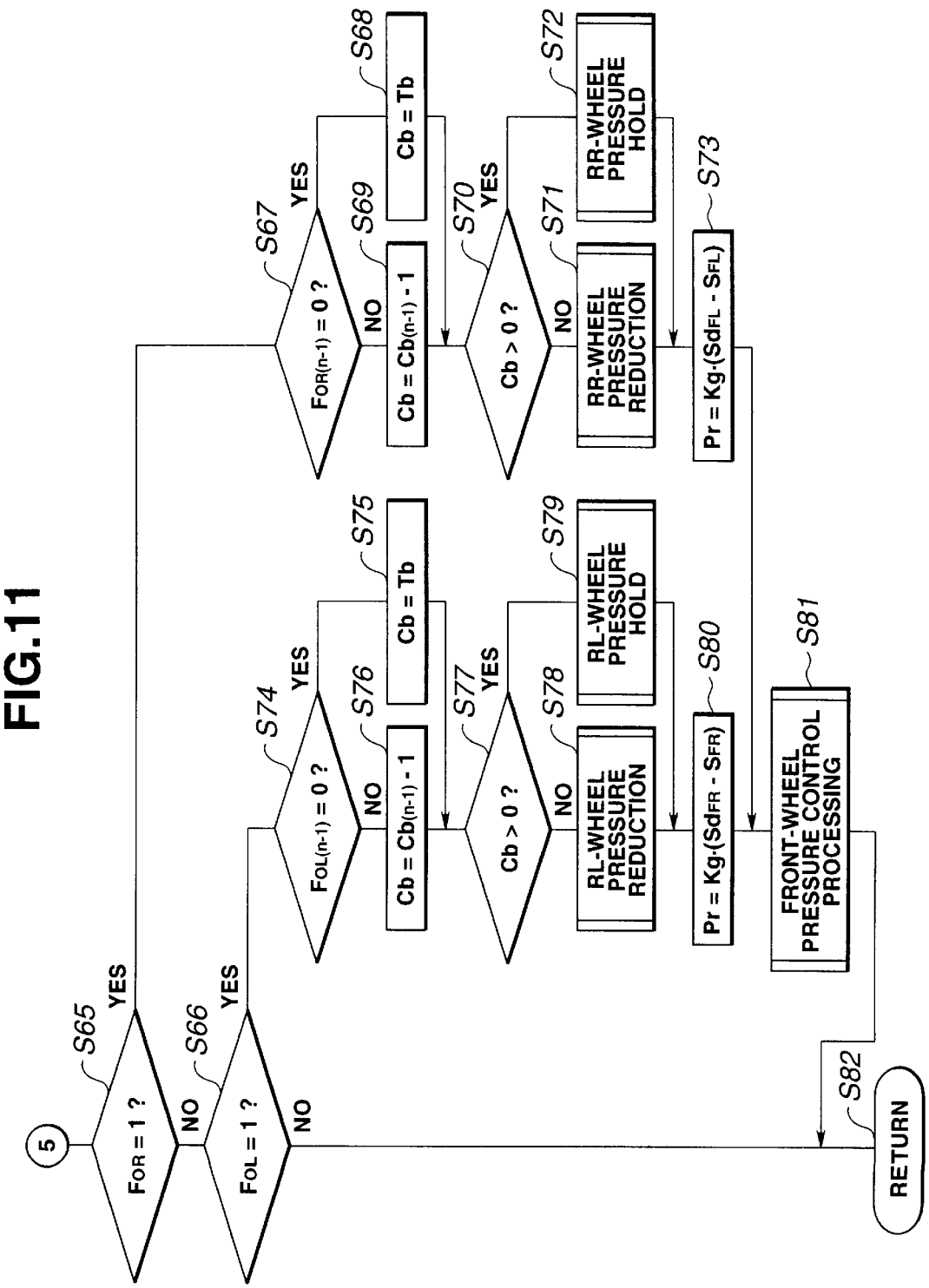
FIG. 11 shows a sixth series of steps (S65–S82) of the vehicle dynamics control routine following either steps S36 or S51 of FIG. 9.

Subsequently to step S51 of FIG. 9, a series of steps S65–S82 of FIG. 11 follow. Steps S65–S82 of FIG. 11 are provided for reducing the fluid pressure within the inner rear wheel-brake cylinder down to the minimum value to compensate for undesired left-turn oversteer or right-turn oversteer (see FIGS. 13 and 15), and for properly regulating the fluid pressure within the outer front wheel-brake cylinder by adjusting the pressure level of brake fluid delivered from the pump 13B to the brake line 6 by the two valves 23 and 27 or by adjusting the pressure level of brake fluid delivered from the pump 13A to the brake line 5 by the two valves 21 and 25. The flow chart shown in FIG. 11 is hereinbelow described in detail.

In step S65, a test is made to determine whether the right-turn oversteer indicative flag $F_{OR}$ is set at "1". When the answer to step S65 is affirmative, step S67 is entered. Steps S67–S72 (i.e., the pressure-reduction and pressure-hold control for the inner rear road wheel in the right-turn oversteer state) are similar to the previously-discussed steps S37–S42 (i.e., the pressure-reduction and pressure-hold control for the outer rear road wheel in the right-turn understeer state) shown in FIG. 9, and thus detailed description of steps S67 through S72 will be omitted because the above description thereon seems to be self-explanatory. Briefly, through steps S67–S72, the control unit continues to reduce the fluid pressure in the inner rear wheel cylinder (the rear-right wheel-brake cylinder 2) until a predetermined pressure-reduction time duration Tb has been elapsed, while measuring an elapsed time from the beginning of the pressure-reduction control mode by way of the pressure-reduction counter (Cb). As soon as the predetermined pressure-reduction time duration Tb has been elapsed, the control unit operates to shift the fluid-pressure control valve 26 again to the shut-off position, while holding the fluid-pressure control valve 22 at the shut-off position, so as to hold the fluid pressure in the wheel cylinder 2 at the minimum pressure level (for example zero). After steps S71 or S72, step S73 occurs. In step S73, a required controlled-pressure value Pr for the front-left wheel-brake cylinder 1 is calculated from the following expression (20), by multiplication of the difference ($Sd_{FL}$–$S_{FL}$) with a predetermined control gain Kg.

$$Pr = Kg \cdot (Sd_{FL} - S_{FL}) \quad (20)$$

Returning to step S65, when the answer to step S65 is negative, step S66 occurs. Instep S66, a test is made to determine whether the left-turn oversteer indicative flag $F_{OL}$ is set at "1". When the left-turn oversteer indicative flag $F_{OL}$ is set at "1", the procedure flows from step S66 to step S74. Steps S74–S79 related to the rear-left wheel-brake cylinder pressure control (the inner rear wheel-brake cylinder pressure control) are similar to the previously-noted steps S67–S72 related to the rear-right wheel-brake cylinder pressure control. That is, the brake-fluid pressure in the rear-left wheel-brake cylinder 4 is reduced until the preset pressure-reduction time interval Tb has been elapsed, and then the rear-left wheel cylinder pressure is kept at the minimum fluid pressure level (for example zero). Thereafter, step S80 is entered. In step S80, a required controlled-pressure value Pr for the front-right wheel-brake cylinder 3 is calculated from the following expression (21), by multiplication of the difference ($Sd_{FR}$–$S_{FR}$) with the predetermined control gain Kg.

$$Pr = Kg \cdot (Sd_{FR} - S_{FR}) \quad (21)$$

After steps S73 or S80, step S81 occurs. In step S81, the previously-discussed front-wheel pressure control processing is executed in accordance with the flow chart shown in FIG. 10. That is to say, when the control unit determines that the vehicle is in the right-turn oversteer state (see FIG. 15), the fluid-pressure control valves 21 an 25 both associated with the front-left wheel-brake cylinder 1, and the pump 13A are all controlled or driven in response to the pressure build-up pulse signal, the pressure hold pulse signal, or the pressure reduction pulse signal, each of which is based on the required controlled-pressure value Pr (calculated at step S73) for the front-left wheel-brake cylinder 1. Therefore, the outer front wheel cylinder is cyclically operated at either the pressure build-up mode, the pressure reduction mode or the pressure hold mode, every predetermined time intervals TINT such as 30 msec, in order to properly increase the fluid pressure in the outer front wheel cylinder (the front-left wheel-brake cylinder pressure). On the contrary, when the control unit determines that the vehicle is in the left-turn oversteer state, the fluid-pressure control valves 23 an 27 both associated with the front-right wheel-brake cylinder 3, and the pump 13B are all controlled or driven in response to the pressure build-up pulse signal, the pressure hold pulse signal, or the pressure reduction pulse signal, each of which is based on the required controlled-pressure value Pr (calculated at step S80) for the front-right wheel-brake cylinder 3. Therefore, the outer front wheel cylinder is cyclically operated at either the pressure build-up mode, the pressure reduction mode or the pressure hold mode, every predetermined time intervals TINT such as 30 msec, in order to properly increase the fluid pressure in the outer front wheel cylinder (the front-right wheel-brake cylinder pressure). The front-wheel pressure control processing executed in step S81 is identical to that executed in step S51, and thus detailed description of step S81 will be omitted to avoid repetition of the description. After step S81, step S82 proceeds. The procedure returns to the main program through step S82. The vehicle dynamics control routine is executed as time-triggered interrupt routines to be triggered every predetermined time intervals, while a right-hand or left-hand turn is made.

As will be appreciated from the above, first of all, the vehicle dynamics control system of the first embodiment, decides whether the vehicle's cornering behavior is the left-turn understeer, the left-turn oversteer, the right-turn understeer, or the right-turn oversteer. The system is responsive to results of decision for the vehicle's cornering behavior for properly regulating the fluid pressure in each of the wheel-brake cylinders and consequently avoid undesired understeer or oversteer, as briefly described later.

Figure 12:
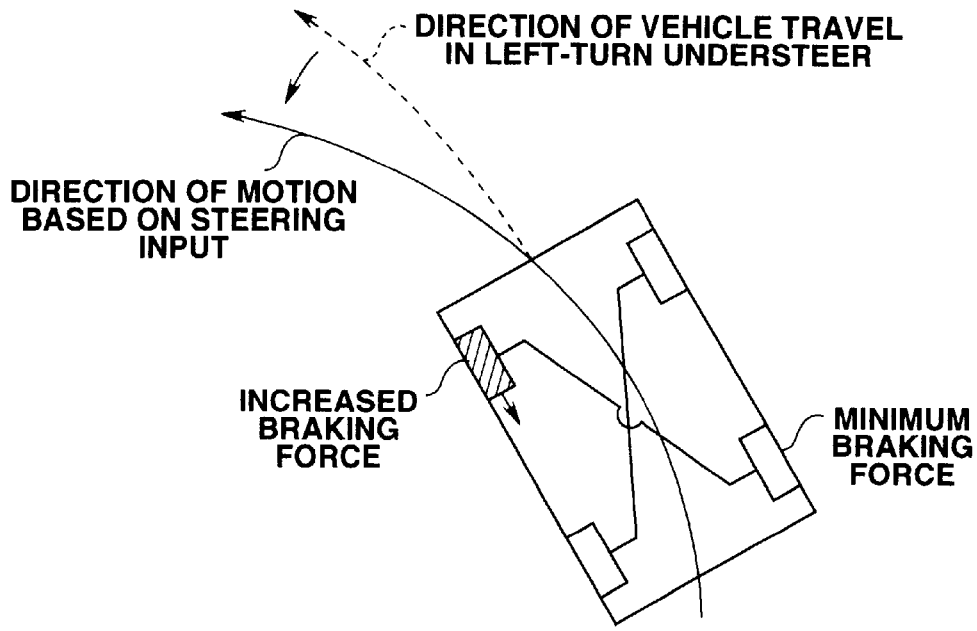
FIG. 12 is an explanatory view showing the operation of the vehicle dynamics control system of the invention for avoidance of left-turn understeer.

As seen in FIG. 12, when the vehicle is in the left-turn understeer state, the system permits the fluid pressure generated from the pump 13A to be directed or fed to the first brake line 5, and simultaneously permits the fluid pressure output from the secondary brake outlet port of the master cylinder to be directed or fed to the second brake line 6, by switching the fluid-pressure selector valves 19 and 20 and the fluid-pressure control valves 22 and 24 to their desired positions based on instructions from the control unit 36. Thus, the system operates to properly build up the fluid pressure in the front-left wheel cylinder 1 (corresponding to the inner front wheel cylinder) on the basis of the deviation from the target front-left wheel slip rate $Sd_{FL}$ (that is, the difference ($Sd_{FL}$–$S_{FL}$) between the target front-left wheel slip rate and the calculated front-left wheel slip rate), and simultaneously to reduce the fluid pressure in the rear-right wheel-brake cylinder 2 to the minimum pressure level, by switching the fluid-pressure control valves 21, 25 and 26 to their desired positions based on instructions from the control unit 36. This properly increases the braking force acting on the front-left road wheel and reduce the braking force acting on the rear-right road wheel to the minimum, thereby resulting in a reasonable yawing moment about the z-axis in the anti-clockwise direction, effectively counter-acting the left-turn understeer, and compensating for the undesired left-turn understeer towards neutral steer.

Figure 13:
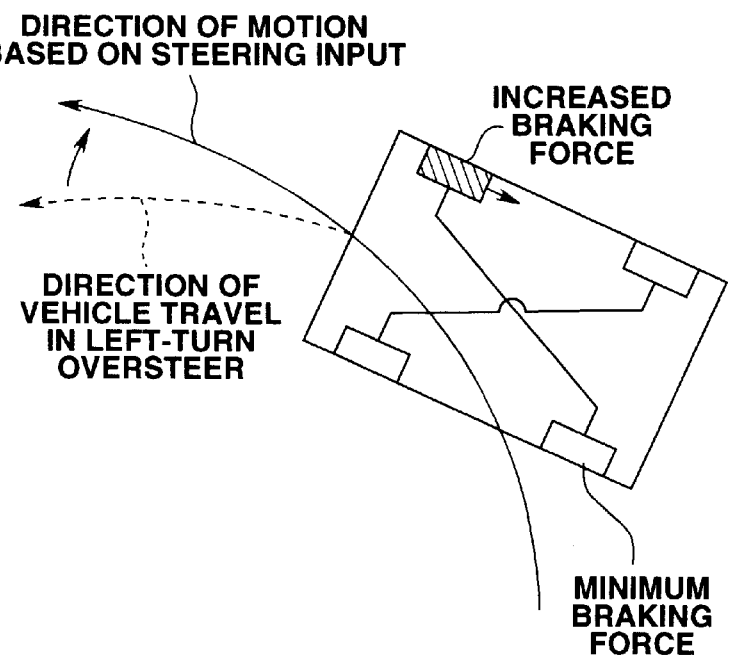
FIG. 13 is an explanatory view showing the operation of the vehicle dynamics control system of the invention for avoidance of left-turn oversteer.

As seen in FIG. 13, when the vehicle is in the left-turn oversteer state, the system permits the fluid pressure generated from the pump 13B to be directed or fed to the second brake line 6, and simultaneously permits the fluid pressure output from the primary brake outlet port of the master cylinder to be directed or fed to the first brake line 5, by switching the fluid-pressure selector valves 19 and 20 and the fluid-pressure control valves 22 and 24 to their desired positions based on instructions from the control unit 36. Thus, the system operates to properly build up the fluid pressure in the front-right wheel cylinder 3 (corresponding to the outer front wheel cylinder) on the basis of the deviation from the target front-right wheel slip rate $Sd_{FR}$ (that is, the difference ($Sd_{FR}-S_{FR}$) between the target front-right wheel slip rate and the calculated front-right wheel slip rate), and simultaneously to reduce the fluid pressure in the rear-left wheel-brake cylinder 4 to the minimum pressure level, by switching the fluid-pressure control valves 23, 27 and 28 to their desired positions based on instructions from the control unit 36. This properly increases the braking force acting on the front-right road wheel and reduce the braking force acting on the rear-left road wheel to the minimum, thereby resulting in a reasonable yawing moment about the z-axis in the clockwise direction, effectively counter-acting the left-turn oversteer, and compensating for the undesired left-turn oversteer towards neutral steer.

Figure 14:
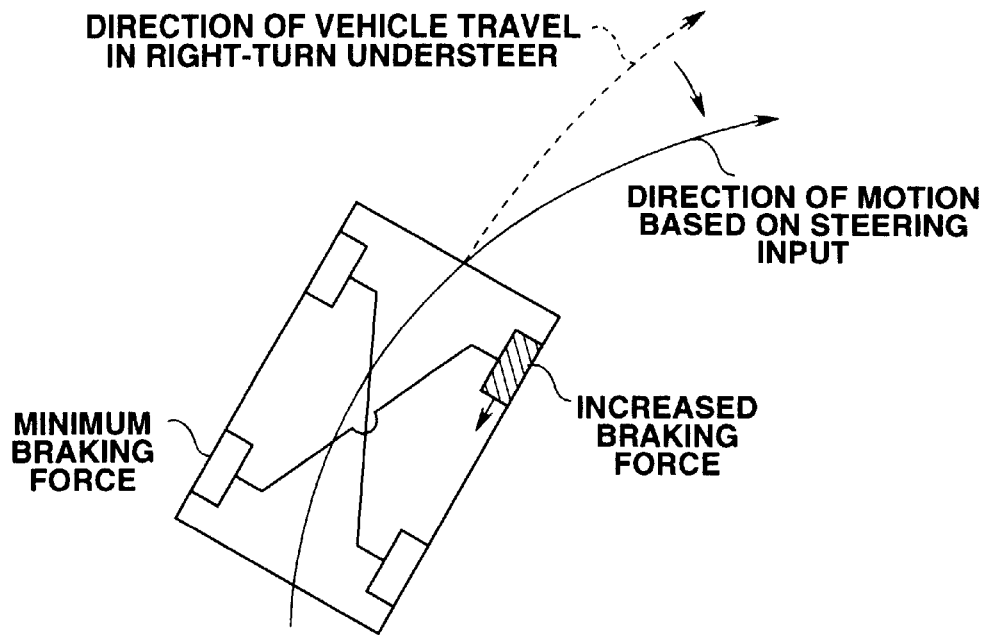
FIG. 14 is an explanatory view showing the operation of the vehicle dynamics control system of the invention for avoidance of right-turn understeer.

As seen in FIG. 14, when the vehicle is in the right-turn understeer state, the system operates in the same manner as the brake-fluid pressure control counter-acting the left-turn oversteer as shown in FIG. 13. That is, the system operates to properly build up the fluid pressure in the front-right wheel cylinder 3 (corresponding to the inner front wheel cylinder) on the basis of the deviation from the target front-right wheel slip rate $Sd_{FR}$, and simultaneously to reduce the fluid pressure in the rear-left wheel-brake cylinder 4 to the minimum pressure level. This properly increases the braking force acting on the front-right road wheel and reduce the braking force acting on the rear-left road wheel to the minimum, thereby resulting in a reasonable yawing moment about the z-axis in the clockwise direction, effectively counter-acting the right-turn understeer, and compensating for the undesired right-turn understeer towards neutral steer.

Figure 15:
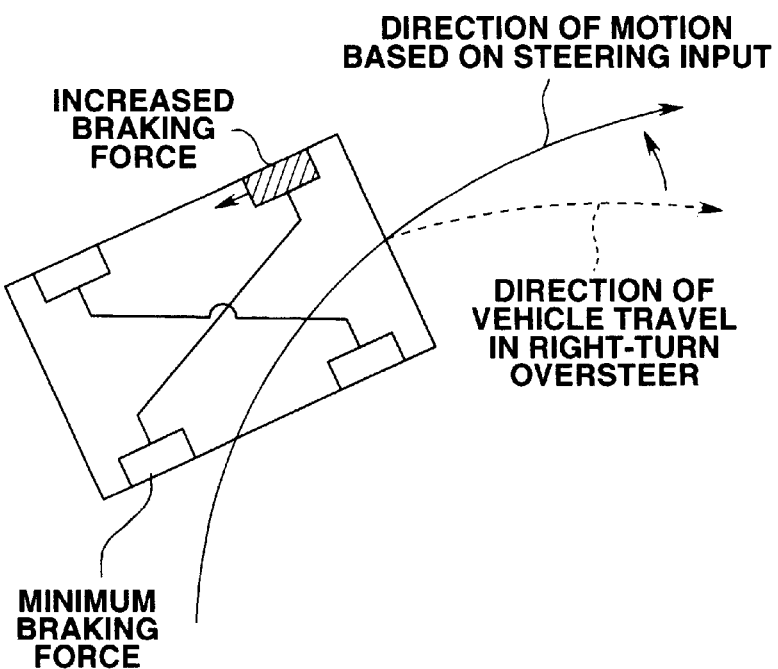
FIG. 15 is an explanatory view showing the operation of the vehicle dynamics control system of the invention for avoidance of right-turn oversteer.

As seen in FIG. 15, when the vehicle is in the right-turn oversteer state, the system operates in the same manner as the brake-fluid pressure control counter-acting the left-turn understeer as shown in FIG. 12. That is, the system operates to properly build up the fluid pressure in the front-left wheel cylinder 1 (corresponding to the outer front wheel cylinder) on the basis of the deviation from the target front-left wheel slip rate $Sd_{FL}$, and simultaneously to reduce the fluid pressure in the rear-right wheel-brake cylinder 2 to the minimum pressure level. This properly increases the braking force acting on the front-left road wheel and reduce the braking force acting on the rear-right road wheel to the minimum, thereby resulting in a reasonable yawing moment about the z-axis in the anti-clockwise direction, effectively counter-acting the right-turn oversteer, and compensating for the undesired right-turn oversteer towards neutral steer.

Particularly in front-engine front-wheel-drive (FF) vehicles, the center-of-gravity of the car tends to be offset toward the front end. Also, on turns, there is a tendency for rear-to-front load transfer to occur. Accounting for the previously-noted conditions (handling influences) inherent in the front-drive front-wheel-drive vehicles, the system of the embodiment functions to automatically increase the braking force of a selected one of the front road wheels in order to avoid undesired understeer or oversteer which may occur on turns. This creates a yawing moment effectively eliminating or counter-acting understeer or oversteer tendencies on turns. Furthermore, according to the system of the first embodiment, even when the automatic fluid-pressure control is executed with regard to the front-left wheel cylinder 1 and the rear-right wheel cylinder 2 with the control pump 13A in operation in the left-turn understeer state (see FIG. 12) or in the right-turn oversteer state (see FIG. 15), the braking force of the front-right wheel and the braking force of the rear-left wheel can be changed or regulated depending on the magnitude of the driver's brake-pedal depression. Also, even when the automatic fluid-pressure control is executed with regard to the front-right wheel cylinder 3 and the rear-left wheel cylinder 4 with the control pump 13B in operation in the left-turn oversteer state (see FIG. 13) or in the right-turn understeer state (see FIG. 14), the braking force of the front-left wheel and the braking force of the rear-right wheel can be changed or regulated depending on the magnitude of the driver's brake-pedal depression. Therefore, in the system of the shown embodiment, the vehicle can be properly decelerated according to the driver's wishes. Moreover, in the event that the vehicle dynamics control system is damaged or malfunctioning, the system permits the master-cylinder pressure to be directed to one diagonally-opposed wheel-brake cylinders which are not subjected to the automatic brake-fluid pressure control, and thus the vehicle can be decelerated even in the presence of the vehicle dynamics control system's failure or malfunction.

Figure 16:
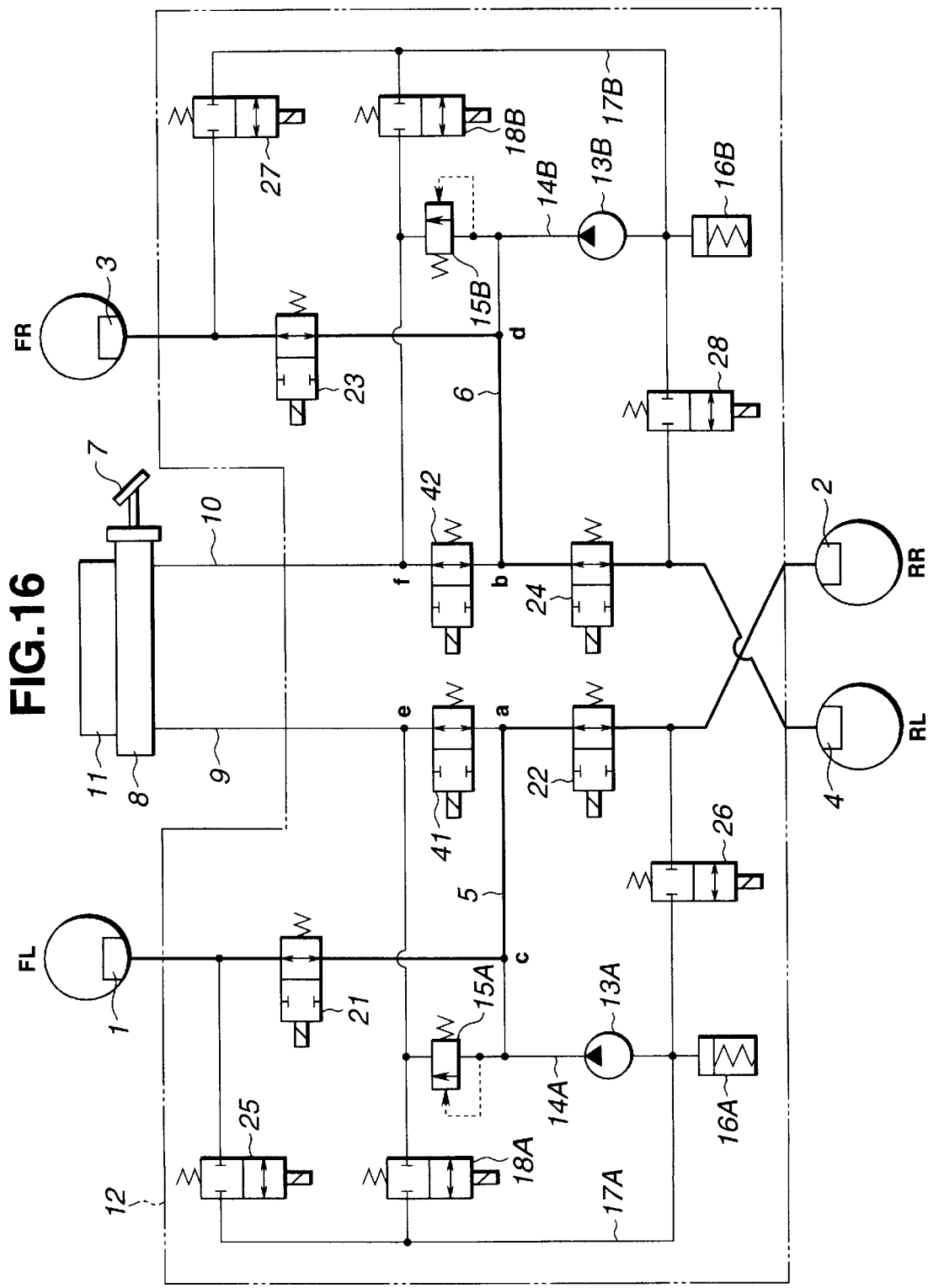
FIG. 16 is a hydraulic circuit diagram illustrating a modified hydraulic circuit being applicable to the vehicle dynamics control system of the second embodiment.

Referring now to FIG. 16, there is shown the modified hydraulic circuit being applicable to the vehicle dynamics control system of the second embodiment. The modified hydraulic circuit shown in FIG. 16 is similar to that of FIG. 3, except that the fluid-pressure selector valves 19 and 20 included in the hydraulic circuit of the first embodiment are replaced with a pair of fluid-pressure selector valves 41 and 42. The same reference signs used to designate elements in the hydraulic circuit shown in FIG. 3 will be applied to the corresponding elements used in the modified hydraulic circuit shown in FIG. 16, for the purpose of comparison of the slightly different hydraulic circuits. In the modified hydraulic circuit shown in FIG. 16, the fluid-pressure selector valve 41 which serves as a first brake-fluid pressure selector means is fluidly disposed in the primary fluid-supply conduit 9, whereas the fluid-pressure selector valve 42 which serves as a second brake-fluid pressure selector means is fluidly disposed in the secondary fluid-supply conduit 10. In the second embodiment, each of the fluid-pressure selector valves 41 and 42 is comprised of atypical two-port, two-position, normally-open type electro-magnetic directional control valve. In the modified hydraulic circuit, the valve position of the primary fluid-pressure selector valve 41 is switched by a control signal (or a drive signal) generated from the control unit 36, for selecting a required fluid pressure to be directed to the first brake line 5 from between the brake-fluid pressure output from the primary master-cylinder outlet port and the brake-fluid pressure output from the control pump 13A. That is, the system permits the supply of brake-fluid pressure output from the primary master-cylinder outlet port to the first brake line 5 with the fluid-pressure selector valve 41 held at its fluid-communication position, and alternatively permits the supply of brake-fluid pressure output from the pump 13A with the selector valve 41 switched to its shut-off position. On the other hand, the valve position of the secondary fluid-pressure selector valve 42 is switched by a control signal (or a drive signal) generated from the control unit 36, for selecting a required fluid pressure to be directed to the second brake line 6 from between the brake-fluid pressure output from the secondary master-cylinder outlet port and the brake-fluid pressure output from the control pump 13B. That is, the system permits the supply of brake-fluid pressure output from the secondary master-cylinder outlet port to the second brake line 6 with the fluid-pressure selector valve 42 maintained at its fluid-communication position, and alternatively permits the supply of brake-fluid pressure output from the pump 13B with the selector valve 42 switched to its shut-off position. The system of the second embodiment employing the modified hydraulic circuit shown in FIG. 16 operates in the same manner as that of the first embodiment, thus providing the same effects as the first embodiment.

In the shown embodiments, although the vehicle dynamics control system is exemplified in front-engine, front-wheel-drive vehicles having a so-called X-split layout of brake circuits, it will be appreciated that the fundamental concept of the present invention may be applicable to front-engine rear-wheel-drive (FR) vehicles having an X-split layout of brake circuits or to rear-engine rear-wheel-drive (RR) vehicles having an X-split layout of brake circuits. As may be appreciated, in front-engine rear-wheel-drive or rear-engine rear-wheel-drive arrangements, there is a tendency of rear-to-front load transfer with a deceleration (a negative acceleration) on turns. Thus, in the front-engine rear-wheel-drive or rear-engine rear-wheel-drive vehicles with an X-split layout of brake circuits, assuming that the vehicle experiences undesired understeer or oversteer on turns, the understeer or oversteer tendencies can be effectively compensated for by increasing the braking force of a properly selected one of front road wheels and by forcibly automatically creating a yawing moment which counter-acts the undesired vehicle's cornering behavior.

The fundamental concept of the vehicle dynamics control system of the invention will be hereinafter described in brief by reference to the block diagram shown in FIG. 1.

Figure 1:
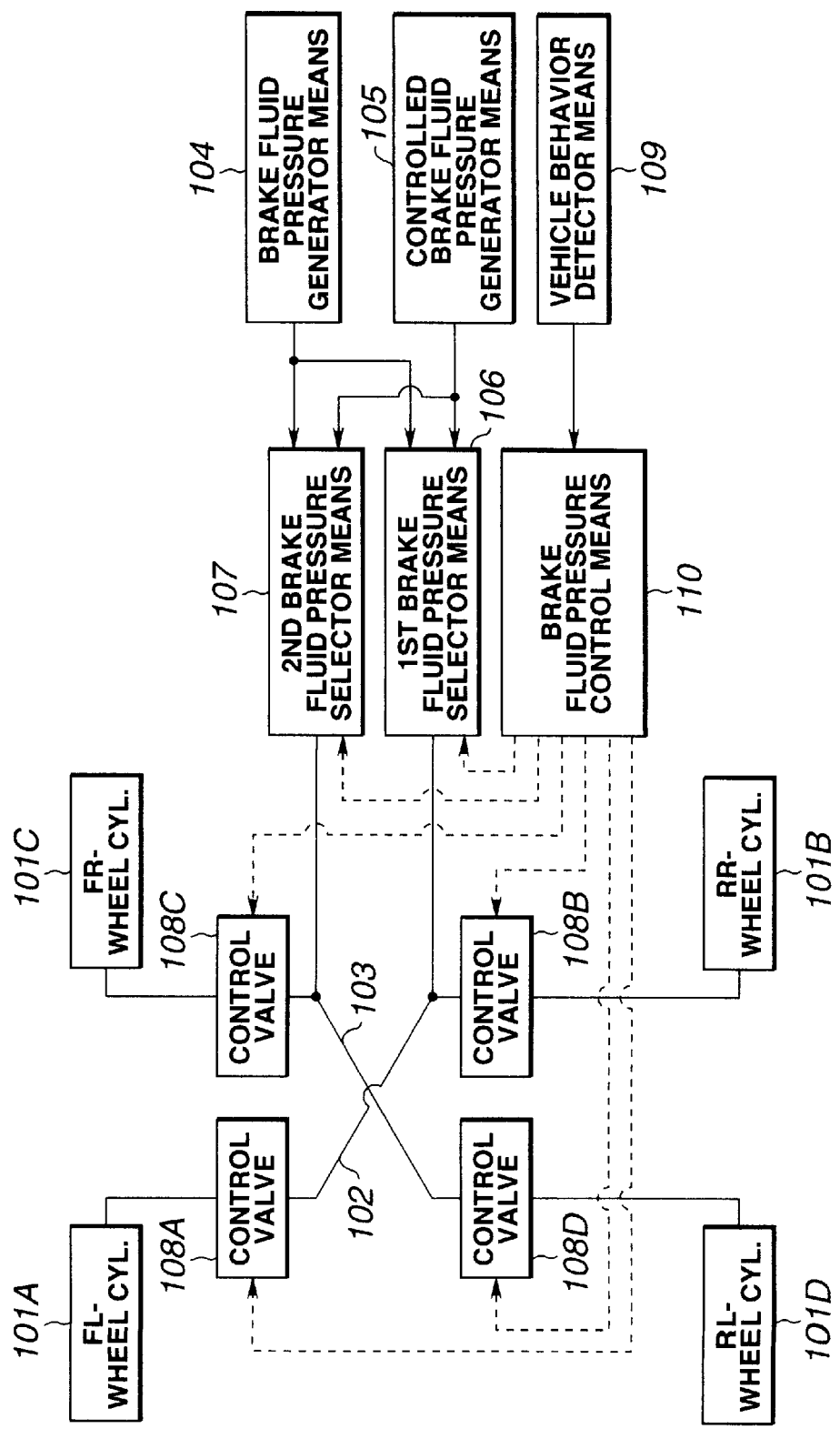
FIG. 1 is a block diagram illustrating a fundamental concept of a vehicle dynamics control system according to the invention.

As seen in FIG. 1, when the brake fluid pressure control means 110 determines that the vehicle is in the understeer state on turns, on the basis of results detected by the vehicle behavior detector means 109, the system operates to supply the fluid pressure generated from the controlled brake fluid pressure generator means 105 to the inner front wheel-brake cylinder of the wheel-brake cylinders 101A through 101D. When the brake-fluid pressure control means 110 determines that the vehicle is in the oversteer state on turns, the system operates to supply the fluid pressure generated from the controlled brake-fluid pressure generator means 105 to the outer front wheel-brake cylinder of the wheel-brake cylinders 101A through 101D. With the previously-noted arrangement, for example when the left-turn understeer state is detected by the vehicle-behavior detector means 109, the brake-fluid pressure control means 110 operates the first brake-fluid pressure selector means 106 in such a manner as to direct or feed the fluid pressure generated from the controlled brake-fluid pressure generator means 105 to the first brake line 102, and simultaneously operates the fluid-pressure control valves 108A and 108B fluidly disposed in the first brake line 102 in such a manner as to direct or feed the fluid pressure output from the controlled brake-fluid pressure generator means 105 to the front-left wheel-brake cylinder 101A (corresponding to the inner front wheel cylinder). As a result, the braking force acting on the front-left road wheel is increased as compared with the other road wheels and thus a yawing moment acting anti-clockwise about the z-axis is increased. Therefore, the left-turn understeer tendency can be effectively compensated for toward neutral steer. When the left-turn oversteer state is detected by the vehicle-behavior detector means 109, the brake-fluid pressure control means 110 operates the second brake-fluid pressure selector means 107 in such a manner as to direct or feed the fluid pressure generated from the controlled brake-fluid pressure generator means 105 to the second brake line 103, and simultaneously operates the fluid-pressure control valves 108C and 108D fluidly disposed in the second brake line 103 in such a manner as to direct or feed the fluid pressure output from the controlled brake-fluid pressure generator means 105 to the front-right wheel-brake cylinder 101C (corresponding to the outer front wheel cylinder). As a result, the braking force acting on the front-right road wheel is increased as compared with the other road wheels and thus a yawing moment acting clockwise about the z-axis is increased. As a consequence, the left-turn oversteer tendency can be effectively compensated for toward neutral steer. When the right-turn understeer state is detected by the vehicle-behavior detector means 109, the brake-fluid pressure control means 110 operates the second brake-fluid pressure selector means 107 in such a manner as to direct or feed the fluid pressure generated from the controlled brake-fluid pressure generator means 105 to the second brake line 103, and simultaneously operates the fluid-pressure control valves 108C and 108D fluidly disposed in the second brake line 103 in such a manner as to direct or feed the fluid pressure output from the controlled brake-fluid pressure generator means 105 to the front-right wheel-brake cylinder 101C (corresponding to the inner front wheel cylinder). As a result, the braking force acting on the front-right road wheel is increased as compared with the other road wheels and thus a yawing moment acting clockwise about the z-axis is increased. As a consequence, the right-turn understeer tendency can be effectively compensated for toward neutral steer. Conversely, when the right-turn oversteer state is detected by the vehicle-behavior detector means 109, the brake-fluid pressure control means 110 operates the first brake-fluid pressure selector means 106 in such a manner as to direct or feed the fluid pressure generated from the controlled brake-fluid pressure generator means 105 to the first brake line 102, and simultaneously operates the fluid-pressure control valves 108A and 108B fluidly disposed in the first brake line 102 in such a manner as to direct or feed the fluid pressure output from the controlled brake-fluid pressure generator means 105 to the front-left wheel-brake cylinder 101A (corresponding to the outer front wheel cylinder). As a result, the braking force acting on the front-left road wheel is increased as compared with the other road wheels and thus a yawing moment acting clockwise about the z-axis is effectively suppressed. Therefore, the right-turn oversteer tendency can be effectively compensated for toward neutral steer. Preferably, the system of FIG. 1 operates to reduce the brake-fluid pressure in the outer rear road wheel of the wheel-brake cylinders 101A through 101D when the understeer state is detected by the vehicle-behavior detector means 109 during turns, and operates to reduce the brake-fluid pressure in the inner rear road wheel of the wheel-brake cylinders 101A through 101D when the oversteer state is detected by the vehicle-behavior detector means 109 during turns. According to the preferable arrangement, in the left-turn understeer state, the rear-right wheel-brake cylinder pressure is reduced, and thus a yawing moment acting anti-clockwise about the z-axis is increased. As a result, during the left-turn understeer state, the direction of actual vehicle travel is compensated for toward the direction of desired vehicle motion based on steering input. This avoids the understeer tendency. On the contrary, in the left-turn oversteer state, the rear-left wheel-brake cylinder pressure is reduced, and thus a yawing moment acting clockwise about the z-axis is increased. As a result, during the left-turn oversteer state, the direction of actual vehicle travel is compensated for toward the direction of desired vehicle motion based on steering input, thereby avoiding the oversteer tendency. Likewise, in the right-turn understeer state, the rear-left wheel-brake cylinder pressure is reduced, and thus a yawing moment acting clockwise about the z-axis is increased to effectively avoid the understeer tendency. Conversely, in the right-turn oversteer state, the rear-right wheel-brake cylinder pressure is reduced, and thus a yawing moment acting clockwise about the z-axis is suppressed to effectively avoid the oversteer tendency. More preferably, in the system of FIG. 1, the brake-fluid pressure control means 110 permits the fluid pressure output from the brake-fluid pressure generator means 104 (the master cylinder) to be directed or fed to a brake line connected to both the outer front wheel-brake cylinder and the inner rear wheel-brake cylinder from between the first and second brake lines 102 and 103, when the understeer state is detected by the vehicle-behavior detector means 109 during turns. Also, the brake-fluid pressure control means 110 permits the fluid pressure output from the brake-fluid pressure generator means 104 to be directed or fed to a brake line connected to both the inner front wheel-brake cylinder and the outer rear wheel-brake cylinder from between the first and second brake lines 102 and 103, when the oversteer state is detected by the vehicle-behavior detector means 109 during turns. According to the more preferable arrangement, for example when the left-turn understeer state is detected by the vehicle-behavior detector means 109, the brake-fluid pressure control means 110 operates the second brake-fluid pressure selector means 107, and the fluid-pressure control valves 108C and 108D in such a manner as to direct or feed the fluid pressure output from the brake-fluid pressure generator means 104 to the second brake line 103. This permits the fluid pressure based on the magnitude of driver's brake-pedal depression to be directed to one diagonally-opposed pair, namely the front-right wheel-brake cylinder and the rear-left wheel-brake cylinder. Thus, the braking forces of the one diagonally-opposed pair (the front-right and rear-left wheels) can be suitably adjusted depending on the driver's braking work. When the left-turn oversteer state is detected, the brake-fluid pressure control means 110 operates the first brake-fluid pressure selector means 106, and the fluid-pressure control valves 108A and 108B in such a manner as to direct or feed the fluid pressure output from the brake-fluid pressure generator means 104 to the first brake line 102. This permits the fluid pressure based on the magnitude of driver's brake-pedal depression to be directed to the other diagonally-opposed pair, namely the front-left wheel-brake cylinder and the rear-right wheel-brake cylinder, with the result that the braking forces of the other diagonally-opposed pair can be suitably adjusted depending on the driver's braking work. Likewise, when the right-turn understeer state is detected, the brake-fluid pressure based on the driver's brake-pedal depression is supplied to the front-left and rear-right road wheels and thus the braking forces acting on the front-left and rear-right road wheels are able to vary depending on the driver's braking work. Conversely, when the right-turn oversteer state is detected, the brake-fluid pressure based on the driver's brake-pedal depression is supplied to the front-right and rear-left road wheels and thus the braking forces acting on the front-right and rear-left road wheels are able to vary depending on the driver's braking work.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A vehicle dynamics control system for an automotive vehicle with a diagonal split layout of brake circuits, said system comprising:

a first brake line connected to a first diagonally-opposed pair of wheel-brake cylinders;

a second brake line connected to a second diagonally-opposed pair of wheel-brake cylinders;

a first brake-fluid pressure generator for generating a first brake-fluid pressure which is variable depending on a magnitude of brake-pedal depression;

a second brake-fluid pressure generator for generating a second brake-fluid pressure, independently of said first brake-fluid pressure based on the magnitude of brake-pedal depression;

a first brake-fluid pressure selector valve means for selecting a brake-fluid pressure to be fed to said first brake line from between said first and second brake-fluid pressures;

a second brake-fluid pressure selector valve means for selecting a brake-fluid pressure to be fed to said second brake line from between said first and second brake-fluid pressures;

a first pressure control valve means fluidly disposed in a first brake circuit including said first brake line for regulating a fluid pressure in each of said first diagonally-opposed pair of wheel-brake cylinders;

a second pressure control valve means fluidly disposed in a second brake circuit including said second brake line for regulating a fluid pressure in each of said second diagonally-opposed pair of wheel-brake cylinders;

a vehicle-behavior detector for detecting a vehicle's cornering behavior; and a brake-fluid pressure control means being responsive to input information from said vehicle-behavior detector for controlling said first and second brake-fluid pressure selector valve means and said first and second pressure control valve means;

wherein said brake-fluid pressure control means operates to supply said second brake-fluid pressure to an inner front wheel-brake cylinder of said first and second diagonally-opposed pairs of wheel-brake cylinders for increasing a fluid pressure in the inner front wheel-brake cylinder and operates to reduce a fluid pressure in an outer rear wheel-brake cylinder of said first and second diagonally-opposed pairs of wheel-brake cylinders to a predetermined minimum brake-fluid pressure level when said input information from said vehicle-behavior detector indicates a vehicle understeer during a turn, and said brake-fluid pressure control means operates to supply said second brake-fluid pressure to an outer front wheel-brake cylinder of said first and second diagonally-opposed pairs of wheel-brake cylinders for increasing a fluid pressure in the outer front wheel-brake cylinder and operates to reduce a fluid pressure in an inner rear wheel-brake cylinder of said first and second diagonally-opposed pairs of wheel-brake cylinders to a predetermined minimum brake-fluid pressure level when said input information from said vehicle-behavior detector indicates a vehicle oversteer during a turn.

2. The vehicle dynamics control system as claimed in claim 1, wherein said brake-fluid pressure control means permits said first brake-fluid pressure to be fed to a brake line connected to both the outer front wheel-brake cylinder and the inner rear wheel-brake cylinder from between said first and second brake lines when said input information from said vehicle-behavior detector indicates the vehicle understeer during a turn, and permits said first brake-fluid pressure to be fed to a brake line connected to both the inner front wheel-brake cylinder and the outer rear wheel-brake cylinder from between said first and second brake lines when said input information from said vehicle-behavior detector indicates the vehicle oversteer during a turn.

3. The vehicle dynamics control system as claimed in claim 1, wherein said first brake-fluid pressure generator comprises a dual-brake system master cylinder with two pistons set in tandem.

4. The vehicle dynamics control system as claimed in claim 1, wherein said second brake-fluid pressure generator comprises a pair of single-directional type electric-motor driven hydraulic pumps being respectively disposed in said first and second brake circuits.

5. The vehicle dynamics control system as claimed in claim 1, wherein said vehicle-behavior detector comprises at least wheel speed sensors for monitoring front-left, front-right, rear-left and rear-right wheel speeds a yaw-velocity sensor for monitoring a yaw velocity about a z-axis of the vehicle, a lateral acceleration sensor for monitoring a lateral acceleration exerted on the vehicle, and a steering angle sensor for monitoring a steer angle.

6. A vehicle dynamics control system for an automotive vehicle with a diagonal split layout of brake circuits, said system comprising:

a first brake line connected to a first diagonally-opposed pair of wheel-brake cylinders;

a second brake line connected to a second diagonally-opposed pair of wheel-brake cylinders;

a first brake-fluid pressure generator for generating a first brake-fluid pressure which is variable depending on a magnitude of brake-pedal depression;

a second brake-fluid pressure generator for generating a second brake-fluid pressure, independently of said first brake-fluid pressure based on the magnitude of brake-pedal depression;

a first group of brake-fluid pressure selector valves for selecting a brake-fluid pressure to be fed to said first brake line from between said first and second brake-fluid pressures;

a second group of brake-fluid pressure selector valves for selecting a brake-fluid pressure to be fed to said second brake line from between said first and second brake-fluid pressures;

a first group of pressure control valves fluidly disposed in a first brake circuit including said first brake line for regulating a fluid pressure in each of said first diagonally-opposed pair of wheel-brake cylinders;

a second group of pressure control valves fluidly disposed in a second brake circuit including said second brake line for regulating a fluid pressure in each of said second diagonally-opposed pair of wheel-brake cylinders;

a vehicle-behavior detector for detecting a vehicle's cornering behavior; and a control unit being configured to be connected to said vehicle-behavior detector for controlling said first and second groups of brake-fluid pressure selector valves and said first and second groups of pressure control valves, in response to input information from said vehicle-behavior detector;

wherein said control unit operates to supply said second brake-fluid pressure to an inner front wheel-brake cylinder of said first and second diagonally-opposed pairs of wheel-brake cylinders for increasing a fluid pressure in the inner front wheel-brake cylinder and operates to reduce a fluid pressure in an outer rear wheel-brake cylinder of said first and second diagonally-opposed pairs of wheel-brake cylinders to a predetermined minimum brake-fluid pressure level when said input information from said vehicle-behavior detector indicates a vehicle understeer during a turn, and said control unit operates to supply said second brake-fluid pressure to an outer front wheel-brake cylinder of said first and second diagonally-opposed pairs of wheel-brake cylinders for increasing a fluid pressure in the outer front wheel-brake cylinder and operates to reduce a fluid pressure in an inner rear wheel-brake cylinder of said first and second diagonally-opposed pairs of wheel-brake cylinders to a predetermined minimum brake-fluid pressure level when said input information from said vehicle-behavior detector indicates a vehicle oversteer during a turn.

7. The vehicle dynamics control system as claimed in claim 6, wherein said control unit permits said first brake-fluid pressure to be fed to a brake line connected to both the outer front wheel-brake cylinder and the inner rear wheel-brake cylinder from between said first and second brake lines when said input information from said vehicle-behavior detector indicates the vehicle understeer during a turn, and permits said first brake-fluid pressure to be fed to a brake line connected to both the inner front wheel-brake cylinder and the outer rear wheel-brake cylinder from between said first and second brake lines when said input information from said vehicle-behavior detector indicates the vehicle oversteer during a turn.

8. The vehicle dynamics control system as claimed in claim 6, wherein said first brake-fluid pressure generator comprises a dual-brake system master cylinder with two pistons set in tandem.

9. The vehicle dynamics control system as claimed in claim 6, wherein said second brake-fluid pressure generator comprises a pair of single-directional type electric-motor driven hydraulic pumps being respectively disposed in said first and second brake circuits.

10. The vehicle dynamics control system as claimed in claim 6, wherein said vehicle-behavior detector comprises at least wheel speed sensors for monitoring front-left, front-right, rear-left and rear-right wheel speeds a yaw-velocity sensor for monitoring a yaw velocity about a z-axis of the vehicle, a lateral acceleration sensor for monitoring a lateral acceleration exerted on the vehicle, and a steering angle sensor for monitoring a steer angle.

* * * * *